United States Patent
Inoue et al.

(10) Patent No.: US 10,731,590 B2
(45) Date of Patent: Aug. 4, 2020

(54) CONTROL SYSTEM FOR COMPRESSION-IGNITION ENGINE

(71) Applicant: Mazda Motor Corporation, Aki-gun, Hiroshima (JP)

(72) Inventors: Atsushi Inoue, Aki-gun (JP); Masanari Sueoka, Hiroshima (JP); Keiji Maruyama, Hiroshima (JP); Takuya Ohura, Hiroshima (JP); Tomohiro Nishida, Hiroshima (JP); Yusuke Kawai, Hiroshima (JP); Tetsuya Chikada, Higashihiroshima (JP); Tatsuhiro Tokunaga, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/413,386

(22) Filed: May 15, 2019

(65) Prior Publication Data

US 2019/0360449 A1  Nov. 28, 2019

(30) Foreign Application Priority Data

May 22, 2018 (JP) .................................. 2018-097820

(51) Int. Cl.
*F02D 41/30* (2006.01)
*F02B 1/10* (2006.01)
(Continued)

(52) U.S. Cl.
CPC ............ *F02D 41/3041* (2013.01); *F02B 1/10* (2013.01); *F02D 13/0219* (2013.01);
(Continued)

(58) Field of Classification Search
CPC ...................... F02D 2009/0288; F02D 41/3041
See application file for complete search history.

(56) References Cited

U.S. PATENT DOCUMENTS 6,293,246 B1   9/2001 Tanahashi et al.
6,968,825 B2 * 11/2005 Hitomi .................... F01L 1/053
                                                          123/406.11
(Continued)

FOREIGN PATENT DOCUMENTS

EP        3418540 A1   12/2018
JP     2009108778 A    5/2009
(Continued)

OTHER PUBLICATIONS

Xie, H et al., "Study on spark assisted compression ignition (SACI) combustion with positive valve overlap at medium-high load," Journal of Applied Energy, Aug. 3, 2012, 12 pages.

(Continued)

*Primary Examiner* — Kevin R Steckbauer
(74) *Attorney, Agent, or Firm* — Alleman Hall Creasman & Tuttle LLP

(57) ABSTRACT

A compression-ignition engine control system is provided, which includes an intake phase-variable mechanism and a controller. Within a first operating range and a second operating range on a higher engine load side, the controller controls the variable mechanism to form a gas-fuel ratio (G/F) lean environment in which an air-fuel ratio inside a cylinder is near a stoichiometric air-fuel ratio and burnt gas remains inside the cylinder, and controls a spark plug to spark-ignite mixture gas inside the cylinder to combust in a partial compression-ignition combustion. The controller controls the variable mechanism to retard the intake valve open timing on an advancing side of TDC of an exhaust stroke, as the engine load increases within the first range, and advance the intake valve close timing on a retarding side of TDC of intake stroke, as the engine load increases within the second range.

6 Claims, 28 Drawing Sheets

(51) Int. Cl.
  F02D 13/02 (2006.01)
  F02D 41/00 (2006.01)
  F02P 5/15 (2006.01)
  F02D 9/02 (2006.01)

(52) U.S. Cl.
  CPC ....... F02D 13/0238 (2013.01); F02D 41/005 (2013.01); F02D 41/0007 (2013.01); F02P 5/1502 (2013.01); *F02D 2009/0288* (2013.01); *F02D 2200/101* (2013.01)

(56) References Cited

U.S. PATENT DOCUMENTS

| | | | | |
|---|---|---|---|---|
| 9,334,818 | B2* | 5/2016 | Schwanke | F02D 41/0062 |
| 2005/0016496 | A1* | 1/2005 | Hitomi | F01L 1/053 |
| | | | | 123/305 |
| 2014/0283800 | A1* | 9/2014 | Hellstrom | F02D 41/0062 |
| | | | | 123/568.14 |
| 2019/0145337 | A1* | 5/2019 | Tanaka | F02D 41/3041 |
| | | | | 123/294 |
| 2019/0186394 | A1* | 6/2019 | Sueoka | F02B 1/14 |
| 2019/0186395 | A1* | 6/2019 | Sueoka | F02B 1/14 |
| 2019/0186396 | A1* | 6/2019 | Sueoka | F02D 41/0057 |
| 2019/0360368 | A1* | 11/2019 | Sueoka | F02D 13/0219 |
| 2019/0360382 | A1* | 11/2019 | Inoue | F02P 5/045 |
| 2019/0360409 | A1* | 11/2019 | Sueoka | F02D 41/0002 |
| 2019/0360422 | A1* | 11/2019 | Sueoka | F02D 37/02 |
| 2019/0360425 | A1* | 11/2019 | Inoue | F02B 1/06 |
| 2019/0360450 | A1* | 11/2019 | Sueoka | F02D 41/0057 |
| 2019/0360451 | A1* | 11/2019 | Sueoka | F02P 5/1502 |
| 2020/0072148 | A1* | 3/2020 | Fujiwara | F02D 41/222 |
| 2020/0072150 | A1* | 3/2020 | Fujiwara | F02D 35/023 |

FOREIGN PATENT DOCUMENTS

| | | | |
|---|---|---|---|
| JP | 2014152619 | A | 8/2014 |
| JP | 6249667 | B2 | 12/2017 |

OTHER PUBLICATIONS

Triantopoulos, V., "Experimental and Computational Investigation of Spark Assisted Compression Ignition Combustion Under Boosted, Ultra EGR-Dilute Conditions," Doctor of Philosophy Dissertation, The University of Michigan, Department of Mechanical Engineering, 2018, 238 pages.

Szybist, J et al., "Load Expansion of Stoichiometric HCCI Using Spark Assist and Hydraulic Valve Actuation," SAE International, Oct. 25, 2010, 15 pages.

Gerow, M. et al., "A Comparison of Valving Strategies Appropriate for Multi-Mode Combustion Within a Downsized Boosted Automotive Engine Part B: Mid Load Operation Within the SACI Combustion Regime," Proceedings of the ASME 2013 Internal Combustion Engine Division Fall Technical Conference, Oct. 13, 2013, Dearborn, Michigan, 14 pages.

European Patent Office, Extended European Search Report Issued in Application No. 19174815.1, dated Oct. 22, 2019, Germany, 15 pages.

* cited by examiner

CONTROL SYSTEM FOR COMPRESSION-IGNITION ENGINE

TECHNICAL FIELD

The present disclosure relates to a control system for a compression-ignition engine, which executes partial compression-ignition combustion in which a mixture gas within a cylinder is partially combusted by spark-ignition (SI combustion) and then the remaining mixture gas is combusted by self-ignition (CI combustion).

BACKGROUND OF THE DISCLOSURE

Recently, Homogeneous-Charge Compression Ignition (HCCI) combustion in which gasoline fuel mixed with air is combusted by self-ignition inside a sufficiently compressed combustion chamber has attracted attention. HCCI combustion is a mode in which the mixture gas combusts at a plurality of positions simultaneously without flame propagation and, thus, has a higher combustion speed of the mixture gas than in SI combustion (spark-ignition combustion) which is adopted for general gasoline engines. Therefore, HCCI combustion is said to be significantly advantageous in terms of thermal efficiency. However, in a case of implementing HCCI combustion in an engine of an automobile for which improved thermal efficiency is desired, there are various issues to be solved and an engine which suitably performs the HCCI combustion has not been put into practical use. That is, while the engine mounted on the automobile greatly changes in operating state and its environmental condition, HCCI combustion has issues such as a combustion start timing of the mixture gas (a timing at which the mixture gas self-ignites) greatly varies due to external factors (e.g., atmospheric temperature) and control during a transient operation in which an engine load sharply changes being difficult.

Therefore, instead of combusting all of the mixture gas by self-ignition, it is proposed to combust a portion of the mixture gas by spark-ignition using a spark plug. That is, after forcibly combusting a portion of the mixture gas through flame propagation caused by spark-ignition (SI combustion), the remaining mixture gas is combusted by self-ignition (CI combustion). Hereinafter, such combustion mode is referred to as "SPCCI (SPark Controlled Compression Ignition) combustion."

For example, JP2009-108778A discloses an engine adopting a similar concept to the SPCCI combustion. This engine causes flame propagation combustion by spark-igniting a stratified mixture gas which is formed around a spark plug by a supplementary fuel injection, and then performs a main fuel injection inside a combustion chamber warmed up by an effect of the flame propagation combustion, so as to combust the fuel injected in the main fuel injection through self-ignition.

The CI combustion of the SPCCI combustion occurs when a temperature inside a cylinder (in-cylinder temperature) reaches an ignition temperature of the mixture gas determined by a composition of the mixture gas. Fuel efficiency is maximized by causing the CI combustion when the in-cylinder temperature reaches the ignition temperature near a TDC of compression stroke (CTDC). The in-cylinder temperature increases as pressure inside the cylinder (in-cylinder pressure) increases. An increase in the in-cylinder pressure on the compression stroke when the SPCCI combustion is carried out is caused by two factors: compression work of a piston and the combustion energy of the SI combustion. If flame propagation of the SI combustion is not stable, increasing amounts of the in-cylinder pressure and the in-cylinder temperature resulting from the SI combustion decrease, and thereby it becomes difficult to increase the in-cylinder temperature to the ignition temperature. If the in-cylinder temperature does not fully increase to the ignition temperature, an amount of the mixture gas for the CI combustion decreases, which results in a large amount of the mixture gas combusts by the flame propagation of a long combustion period, or the CI combustion takes place when the piston descends considerably, and as a result, the fuel efficiency decreases. Thus, in order to stabilize the CI combustion to maximize fuel efficiency, it is important to stabilize the flame propagation of the SI combustion.

It may be possible to stabilize the flame propagation of the SI combustion by leaving hot burnt gas in the cylinder. However, if the hot burnt gas remains in the cylinder, the in-cylinder temperature excessively increases when the compression starts, which results in an excessive in-cylinder pressure rise when the CI combustion takes place near the compression top dead center, thereby inducing excessive combustion noise. In order to reduce combustion noise, the ignition timing may be, for example, retarded to delay the start timing of the CI combustion. However, if the ignition timing is retarded, since the CI combustion takes place when the piston descends considerably during the expansion stroke, fuel efficiency decreases.

Thus, since the SPCCI combustion is a novel combustion type, a configuration which can realize a suitable SPCCI combustion has not yet been found so far, i.e., a configuration to increase the ratio of the CI combustion while realizing the stable SPCCI combustion and reducing combustion noise to a tolerable level.

SUMMARY OF THE DISCLOSURE

The present disclosure is made in view of the above situations and aims to provide a control system for a compression-ignition engine, which realizes a suitable partial compression-ignition combustion more certainly.

In order to address the above situations, the present inventors diligently examined a more suitable control of an intake phase-variable mechanism by simultaneously changing an open timing and a close timing of an intake valve, while causing SPCCI combustion at various engine loads. As a result, the present inventors determined that a stable SPCCI combustion can be realized in a wide range of the engine load, and the CI combustion ratio can be increased while keeping combustion noise within a tolerable level by retarding the open timing and the close timing of the intake valve according to an increase in the engine load when the engine load is low, and advancing the open timing and the close timing of the intake valve according to an increase in the engine load when the engine load is high.

According to one aspect of the present disclosure, a control system for a compression-ignition engine is provided. The engine includes a cylinder, an intake passage, an exhaust passage, an intake port communicating the intake passage to the cylinder, an intake valve configured to open and close the intake port, an exhaust port communicating the exhaust passage to the cylinder, an exhaust valve configured to open and close the exhaust port, an injector configured to inject fuel into the cylinder, and a spark plug configured to ignite a mixture gas containing the fuel injected by the injector and air, the engine executing partial compression-ignition combustion in which the mixture gas is spark-ignited with the spark plug to be partially combusted by SI (spark ignition) combustion and the remaining mixture gas self-ignites to be combusted by CI (compression ignition) combustion. The control system includes an intake phase-variable mechanism configured to simultaneously change an open timing and a close timing of the intake valve, and a controller including a processor configured to control parts of the engine, including the intake phase-variable mechanism and the spark plug. While the engine is operating within a given first operating range and a second operating range that is on a higher engine load side of the first operating range, the controller controls the intake phase-variable mechanism to form a gas-fuel ratio (G/F) lean environment in which an air-fuel ratio that is a ratio of air to fuel inside the cylinder is near a stoichiometric air-fuel ratio and burnt gas remains inside the cylinder, and controls the spark plug to spark-ignite the mixture gas so as to combust by the partial compression-ignition combustion at a given timing. While the engine is operating within the first operating range, the controller controls the intake phase-variable mechanism to retard, as the engine load increases at a constant engine speed, the open timing of the intake valve on an advancing side of a top dead center of exhaust stroke. While the engine is operating within the second operating range, the controller controls the intake phase-variable mechanism to advance, as the engine load increases at a constant engine speed, the close timing of the intake valve on a retarding side of a bottom dead center of an intake stroke.

According to this configuration, the suitable SPCCI combustion (partial compression-ignition combustion), that is, the combustion with high thermal efficiency is realized, and fuel efficiency is improved.

For example, in this configuration, within the first operating range, the open timing of the intake valve is retarded on the advancing side of a top dead center of exhaust stroke as the engine load increases (advanced as the engine load decreases). Thus, when the engine load is low and the in-cylinder temperature easily drops, by increasing the open period of the intake valve on the exhaust stroke, the relatively larger amount of burnt gas (internal EGR gas) at high temperature discharged to the intake port and flowing back into the cylinder again can be introduced, and the temperature of the in-cylinder temperature is increased suitably, which improves flame propagation of SI combustion. Further, within the first operating range and when the in-cylinder temperature easily rises due to the high engine load, the amount of burnt gas can be reduced, which prevents that the in-cylinder temperature becomes excessively high and accordingly the start timing of CI combustion advances to increase combustion noise.

Further, in this configuration, within the second operating range that is on the higher engine load side of the first operating range, the close timing of the intake valve is advanced on the retarding side of the bottom dead center of the intake stroke as the engine load increases. Here, when advancing the close timing of the intake valve on the retarding side of the bottom dead center of the intake stroke, a period during which air flows from the cylinder back to the intake port is shortened and an amount of air inside the cylinder can be increased. Therefore, according to this configuration, within the second operating range, the large amount of air corresponding to the high engine load (a large amount of the fuel) can be introduced into the cylinder and the air-fuel ratio can be brought to near the stoichiometric air-fuel ratio reliably.

The first and second operating ranges may be adjacent to each other in an engine load direction bordering on a given first reference load, and the open timing of the intake valve may be set so as to continuously change within the first and second operating ranges when the engine load changes across the first reference load.

According to this configuration, a situation in which the open and close timings of the intake valve greatly vary is prevented when an operation point of the engine shifts between the first operating range and the second operating range. The open timing of the intake valve can reliably be controlled to suitable timings.

The control system may further include an exhaust gas recirculation (EGR) device including an EGR passage communicating the intake passage to the exhaust passage, and an EGR valve configured to adjust an amount of exhaust gas recirculated into the cylinder from the exhaust passage through the EGR passage. Within at least a portion of an engine speed segment of the first operating range, the controller may control the EGR device to increase an external EGR ratio as the engine load increases, the external EGR ratio being a ratio of the exhaust gas introduced into the cylinder.

According to this configuration, within the first operating range, the amount of high-temperature internal EGR gas is reduced when the engine load is high, while the amount of external EGR gas which is the burnt gas of which temperature is reduced by passing through the EGR passage, is increased so as to secure the amount of burnt gas introduced into the cylinder.

The control system may further include a booster configured to boost intake air to be introduced into the cylinder, and an exhaust variable mechanism configured to change a close timing of the exhaust valve. While the engine is operating within a third operating range set in a low load segment of an operating range where the partial compression-ignition combustion is performed in the G/F lean environment, the controller may control the booster to not perform the boost, and control the exhaust variable mechanism to advance, as the engine load increases, a close timing of the exhaust valve on a retarding side of the top dead center of the exhaust stroke. While the engine is operating within a fourth operating range set in a high load segment of the operating range where the partial compression-ignition combustion is performed in the G/F lean environment, the controller may control the booster to perform the boost, and control the exhaust variable mechanism to retard, as the engine load increases, the close timing of the exhaust valve on the retarding side of the top dead center of the exhaust stroke.

In a state where the boost is not performed by the booster, by retarding the close timing of the exhaust valve in the range on the retarding side of TDC of the exhaust stroke, the amount of burnt gas discharged from the cylinder to the exhaust port and flowing back into the cylinder again is increased. Therefore, according to this configuration, within the third operating range in which SPCCI combustion is performed in the G/F lean environment, the internal EGR gas inside the cylinder is increased when the engine load is low, which suitably increases the in-cylinder temperature. Further, within the third operating range, when the engine load is high, the internal EGR gas inside the cylinder is reduced, which prevents the in-cylinder temperature from being excessively high.

On the other hand, in a state where the boost is performed by the booster, by retarding the close timing of the exhaust valve in the range on the retarding side of TDC of the exhaust stroke, the scavenging inside the cylinder is promoted and the burnt gas remaining inside the cylinder can be reduced. Therefore, according to this configuration, within the fourth operating range, the high-temperature burnt gas remaining inside the cylinder is reduced, which prevents the in-cylinder temperature from being excessively high.

The first and second operating ranges may be adjacent to each other in the engine load direction bordering on the given first reference load. The third and fourth operating ranges may be adjacent to each other in the engine load direction bordering on a given second reference load. The first and second reference loads may be set to the same value as each other at least in the part of the engine speed segment.

According to this configuration, a situation in which the open and close timings of the intake valve greatly vary is prevented when an operation point of the engine shifts between the first operating range and the second operating range, and shifts between the third operating range and the fourth operating range. The open timing of the intake valve can be reliably controlled to suitable timings. Further, by adjusting the open timing of the intake valve and the close timing of the exhaust valve, the in-cylinder temperature can be suitable within at least a portion of the engine speed segment of the first to fourth operating ranges.

During the partial compression-ignition combustion, the controller may set a target SI ratio according to an operating condition of the engine and set an ignition timing of the spark plug based on the target SI ratio, the target SI ratio being a target value of a ratio of a heat amount generated by the SI combustion with respect to a total heat generation amount in one combustion cycle.

In this manner, by adjusting the ignition timing so as to achieve SPCCI combustion conforming to the target SI ratio, for example, the ratio of CI combustion is increased (i.e., the SI ratio is reduced). This results in improving thermal efficiency by SPCCI combustion as much as possible.

BRIEF DESCRIPTION OF THE DRAWINGS

FIGS. 5A to 5C are operation maps illustrating a difference in control according to a progression of a warm-up of the engine and an engine speed and an engine load, in which FIG. 5A is a first operation map used in a warmed-up state, FIG. 5B is a second operation map used in a partially warmed-up state, and FIG. 5C is a third operation map used in a cold state.

FIGS. 15A to 15D show charts illustrating the relationship between the engine load and the open timing of the intake valve set at respective engine speeds within the first partially warmed-up range, in which FIG. 15A is a chart at a first speed, FIG. 15B is a chart at a second speed, FIG. 15C is a chart at a third speed, and FIG. 15D is a chart at a fourth speed.

FIGS. 19A to 19D show charts illustrating the relationship between the engine load and the close timing of the exhaust valve set at respective engine speeds within the first partially warmed-up range, in which FIG. 19A is a chart at the first speed, FIG. 19B is a chart at the second speed, FIG. 19C is a chart at the third speed, and FIG. 19D is a chart at the fourth speed.

FIGS. 23A to 23D show charts illustrating the relationship between the engine load and the external EGR ratio set at respective engine speeds within the first partially warmed-up range, in which FIG. 23A is a chart at the first speed, FIG. 23B is a chart at the second speed, FIG. 23C is a chart at the third speed, and FIG. 23D is a chart at the fourth speed.

DETAILED DESCRIPTION OF THE DISCLOSURE (1) Overall Configuration of Engine

Figure 1:
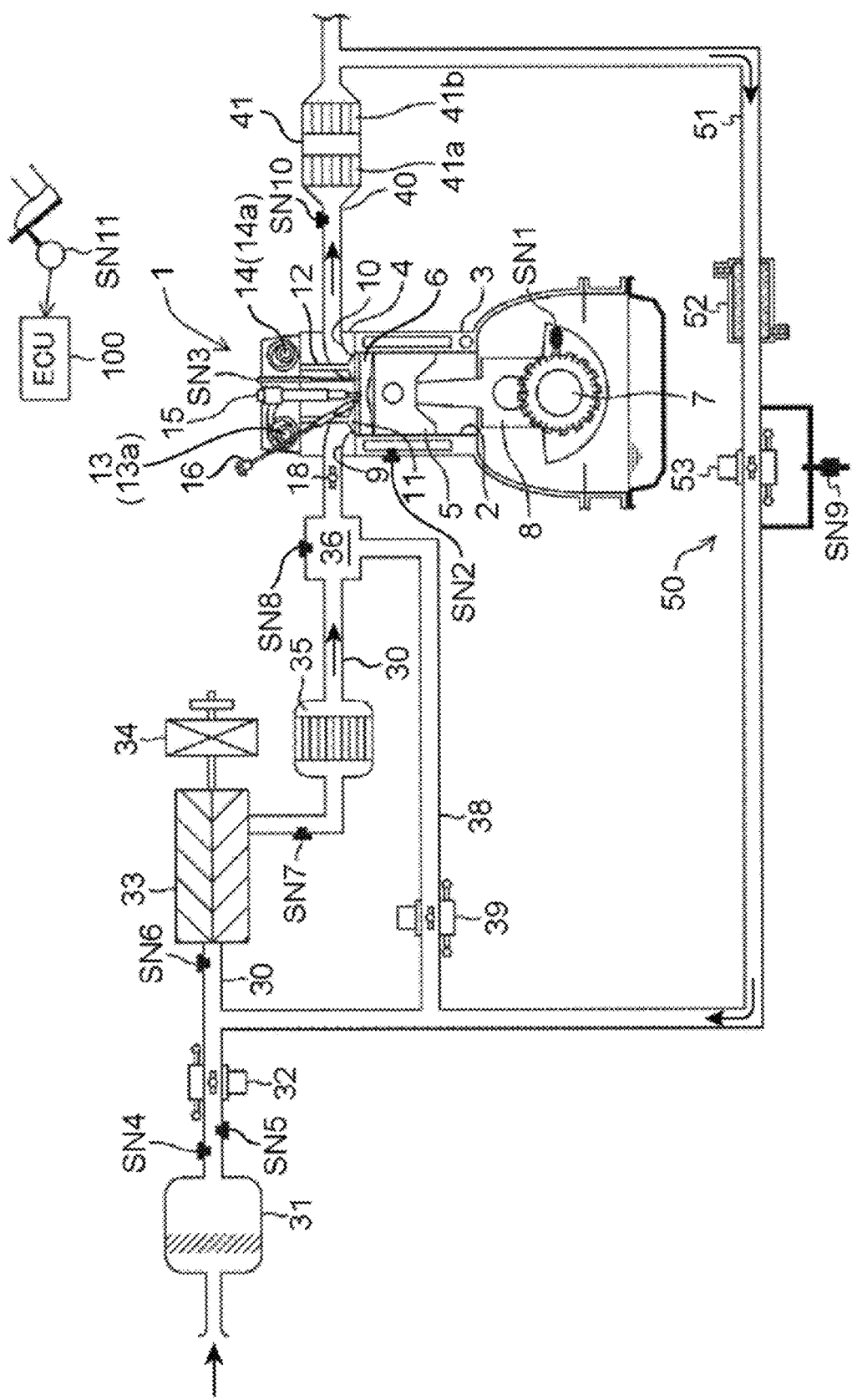
FIG. 1 is a system diagram schematically illustrating an overall configuration of a compression-ignition engine according to one embodiment of the present disclosure.
Figure 2:
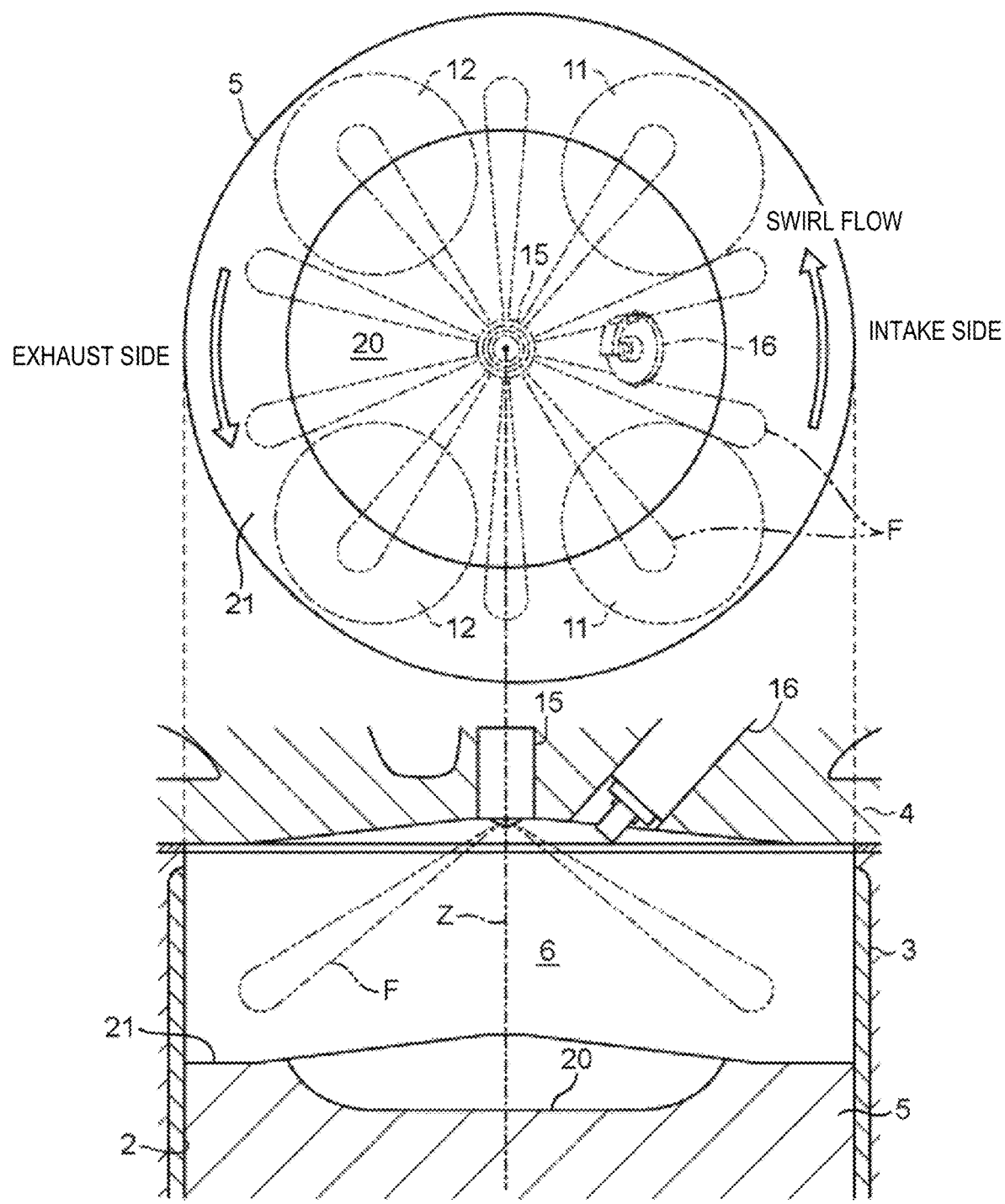
FIG. 2 shows diagrams illustrating a cross-sectional view of an engine body and a plan view of a piston.

FIGS. 1 and 2 are diagrams illustrating a suitable embodiment of a compression-ignition engine (hereinafter, simply referred to as "the engine") to which a control system of the present disclosure is applied. The engine illustrated in FIGS. 1 and 2 is a four-cycle gasoline direct-injection engine mounted on a vehicle as a drive source for traveling, and includes an engine body 1, an intake passage 30 through which intake air to be introduced into the engine body 1 flows, an exhaust passage 40 through which exhaust gas discharged from the engine body 1 flows, and an external exhaust gas recirculation (EGR) device 50 which recirculates a portion of the exhaust gas flowing through the exhaust passage 40 to the intake passage 30. This external EGR device 50 is one example of an "EGR device."

The engine body 1 has a cylinder block 3 formed therein with cylinders 2, a cylinder head 4 attached to an upper surface of the cylinder block 3 so as to cover above the cylinders 2, and a piston 5 reciprocatably fitted into each cylinder 2. Typically, the engine body 1 is of a multi-cylinder type having a plurality of cylinders (e.g., four cylinders). Here, the description is only given regarding one cylinder 2 for the sake of simplicity.

A combustion chamber 6 is defined above the piston 5, and fuel containing gasoline as a main component is injected into the combustion chamber 6 by an injector 15 (described later). Further, the supplied fuel is combusted while being mixed with air in the combustion chamber 6, and expansion force caused by this combustion pushes down the piston 5, and thus, it reciprocates in up-and-down directions of the cylinder. Note that the fuel injected into the combustion chamber 6 may be any fuel as long as it contains gasoline as a main component and, for example, it may contain a subcomponent, such as bioethanol, in addition to gasoline.

A crankshaft 7, which is an output shaft of the engine body 1, is provided below the piston 5. The crankshaft 7 is connected to the piston 5 via a connecting rod 8 and rotates about its center axis according to the reciprocation (up-and-down motion) of the piston 5.

A geometric compression ratio of the cylinder 2, that is, a ratio of the volume of the combustion chamber 6 when the piston 5 is at a top dead center (TDC) to the volume of the combustion chamber 6 when the piston 5 is at a bottom dead center (BDC), is set between 13:1 and 30:1, more preferably between 14:1 and 18:1 as a suitable value for SPCCI combustion described later. More specifically, the geometric compression ratio of the cylinder 2 is set between 14:1 and 17:1 in regular specifications using gasoline fuel having an octane number of about 91, and between 15:1 and 18:1 in high-octane specifications using gasoline fuel having an octane number of about 96.

The cylinder block 3 is provided with a crank angle sensor SN1 which detects a rotational angle of the crankshaft 7 (crank angle) and a rotational speed of the crankshaft 7 (engine speed), and a water temperature sensor SN2 which detects a temperature of a coolant flowing through inside the cylinder block 3 and the cylinder head 4 (engine water temperature).

The cylinder head 4 is formed with an intake port 9 which opens into the combustion chamber 6 to communicate with the intake passage 30 and an exhaust port 10 which opens into the combustion chamber 6 to communicate with the exhaust passage 40, and is provided with an intake valve 11 which opens and closes the intake port 9 and an exhaust valve 12 which opens and closes the exhaust port 10. Note that as illustrated in FIG. 2, the type of valve of the engine of this embodiment is a four-valve type including two intake valves and two exhaust valves. That is, the intake port 9 includes a first intake port 9A and a second intake port 9B, and the exhaust port 10 includes a first exhaust port 10A and a second exhaust port 10B (see FIG. 3). One intake valve 11 is provided for each of the first and second intake ports 9A and 9B, and one exhaust valve 12 is provided for each of the first and second exhaust ports 10A and 10B.

Figure 3:
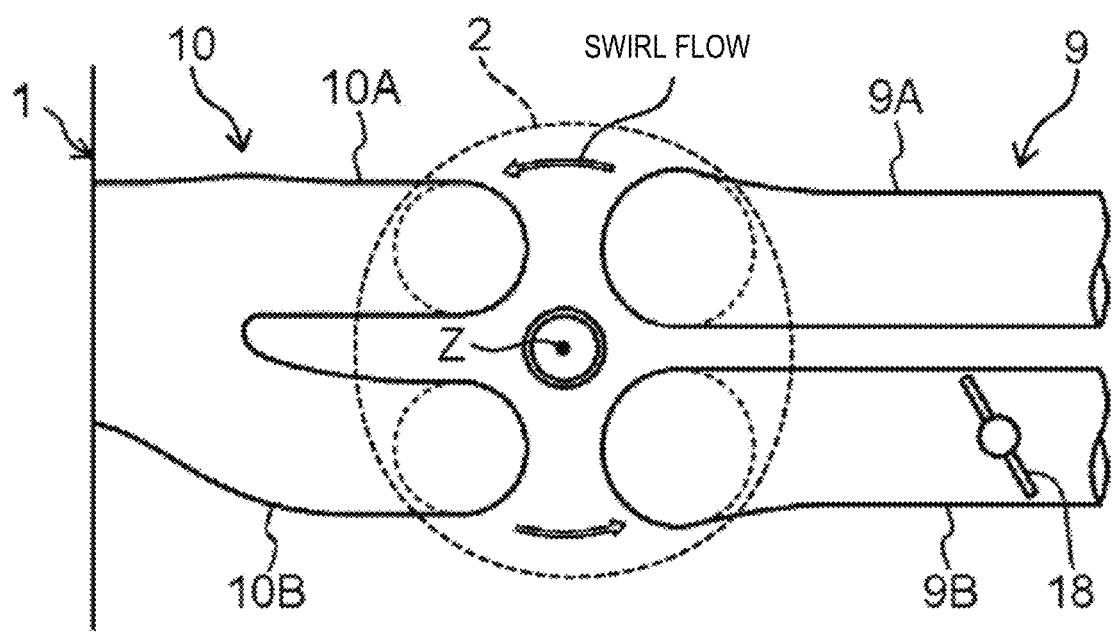
FIG. 3 is a schematic plan view illustrating a structure of a cylinder and intake and exhaust systems in the vicinity thereof

As illustrated in FIG. 3, a swirl valve 18 openable and closable of the second intake port 9B is provided therein. The swirl valve 18 is only provided in the second intake port 9B, and not provided in the first intake port 9A. When such a swirl valve 18 is driven in the closing direction, since a rate of intake air flowing into the combustion chamber 6 from the first intake port 9A in which the swirl valve 18 is not provided increases, a circling flow circling around an axial line Z of the cylinder (a center axis of the combustion chamber 6), i.e., swirl flow is enhanced. Conversely, driving the swirl valve 18 in the opening direction weakens the swirl flow. Note that the intake port 9 of this embodiment is a tumble port formable of a tumble flow. Therefore, the swirl flow formed when closing the swirl valve 18 is an inclined swirl flow mixed with the tumble flow.

The intake valve 11 and the exhaust valve 12 are driven to open and close in conjunction with the rotation of the crankshaft 7 by valve operating mechanisms 13 and 14 including a pair of camshafts disposed in the cylinder head 4.

The valve operating mechanism 13 for the intake valve 11 is built therein with an intake variable valve timing mechanism (VVT) 13a configured to change open and close timings of the intake valve 11. Similarly, the valve operating mechanism 14 for the exhaust valve 12 is built therein with an exhaust VVT 14a configured to change open and close timings of the exhaust valve 12. The intake VVT 13a (exhaust VVT 14a) is a so-called phase-variable mechanism which changes the open and close timings of the intake valve 11 (exhaust valve 12) simultaneously and by the same amount. That is, the open and close timings of the intake valve 11 (exhaust valve 12) are changed while keeping the open period of the valve. The intake VVT 13a is one example of an "intake variable mechanism" or "intake phase-variable mechanism" and the exhaust VVT 14a is one example of an "exhaust variable mechanism."

The open timing of the intake valve 11 is changeable between a given timing on an advancing side of a top dead center (TDC) of exhaust stroke and a given timing on a retarding side of TDC of the exhaust stroke. The open period of the intake valve 11 is set so that when an open timing IVO of the intake valve 11 is at a most advanced timing (a most advanced timing possible), a close timing IVC of the intake valve 11 is set on the retarding side of a bottom dead center (BDC) of intake stroke. Accordingly, the close timing IVC of the intake valve 11 is changed on the retarding side of BDC of the intake stroke. An open timing EVO of the exhaust valve 12 is changeable between a given timing on the advancing side of TDC of the exhaust stroke and a given timing on the retarding side of TDC of the exhaust stroke.

Note that the open timing of the intake valve 11 (exhaust valve 12) described here is not a timing when its lift increases from zero (0), but a timing when a gas flow between the intake port 9 (exhaust port 10) via the intake valve 11 (exhaust valve 12) substantially starts to occur. For example, the lift of the intake valve 11 (exhaust valve 12) increases at a substantially constant rate from a seated state of the valve (i.e., after passing a ramp part) and then sharply rises. The open timing of the intake valve 11 (exhaust valve 12) described here is the timing when the lift sharply rises. Specifically, this timing is when the lift of the intake valve 11 (exhaust valve 12) is about 0.14 mm. Similarly, the close timing of the intake valve 11 (exhaust valve 12) described here is not a timing when its lift becomes zero (0), but a timing when a gas flow between the intake port 9 (exhaust port 10) via the intake valve 11 (exhaust valve 12) substantially stops. For example, the lift of the intake valve 11 (exhaust valve 12) decreases relatively sharply and then further at a substantially constant rate toward zero (i.e., a so-called ramp part is set). The close timing of the intake valve 11 (exhaust valve 12) described here is the timing when the lift sharply drops. Specifically, this timing is when the lift of the intake valve 11 (exhaust valve 12) is about 0.14 mm.

The cylinder head 4 is provided with the injector 15 which injects the fuel (mainly gasoline) into the combustion chamber 6, and a spark plug 16 which ignites a mixture gas containing the fuel injected into the combustion chamber 6 from the injector 15 and air introduced into the combustion chamber 6. The cylinder head 4 is further provided with an in-cylinder pressure sensor SN3 which detects pressure of the combustion chamber 6 (hereinafter, also referred to as "in-cylinder pressure").

As illustrated in FIG. 2, on a crown surface of the piston 5, a cavity 20 is formed by denting a relatively wide area of the piston 5, including a center part thereof, to the opposite side from the cylinder head 4 (downward). Further, a squish portion 21 comprised of an annular flat surface is formed in the crown surface of the piston 5 radially outward of the cavity 20.

The injector 15 is a multi-port injector having a plurality of nozzle ports at its tip portion, and the fuel is injected radially from the plurality of nozzle ports. "F" in FIG. 2 indicates fuel spray injected from the respective nozzle ports and, in the example of FIG. 2, the injector 15 has ten nozzle ports at an even interval in a circumferential direction thereof. The injector 15 is disposed in a center portion of a ceiling surface of the combustion chamber 6 so that its tip portion opposes to a center portion (a bottom center portion of the cavity 20) of the crown surface of the piston 5.

The spark plug 16 is disposed at a somewhat offset position to the intake side with respect to the injector 15. The tip portion (electrode portion) of the spark plug 16 is located at a position overlapping with the cavity 20 in the plan view.

As illustrated in FIG. 1, the intake passage 30 is connected to one side surface of the cylinder head 4 to communicate with the intake ports 9. Air (fresh air) taken in from an upstream end of the intake passage 30 is introduced into the combustion chamber 6 through the intake passage 30 and the intake port 9.

In the intake passage 30, an air cleaner 31 which removes foreign matters within the intake air, a throttle valve 32 which adjusts a flow rate of intake air, a booster 33 which pumps the intake air while compressing it, an intercooler 35 which cools the intake air compressed by the booster 33, and a surge tank 36 are provided in this order from the upstream side.

An airflow sensor SN4 which detects the flow rate of intake air, first and second intake air temperature sensors SN5 and SN7 which detect the temperature of the intake air, and first and second intake air pressure sensors SN6 and SN8 which detect pressure of the intake air are provided in various parts of the intake passage 30. The airflow sensor SN4 and the first intake air temperature sensor SN5 are provided in a portion of the intake passage 30 between the air cleaner 31 and the throttle valve 32, and detect the flow rate and the temperature of the intake air passing through this portion. The first intake air pressure sensor SN6 is provided in a portion of the intake passage 30 between the throttle valve 32 and the booster 33 (downstream of a connection port of an EGR passage 51 described later), and detects the pressure of the intake air passing through this portion. The second intake air temperature sensor SN7 is provided in a portion of the intake passage 30 between the booster 33 and the intercooler 35, and detects the temperature of intake air passing through this portion. The second intake air pressure sensor SN8 is provided in the surge tank 36 and detects the pressure of intake air in the surge tank 36.

The booster 33 is a mechanical booster (supercharger) mechanically linked to the engine body 1. Although the specific type of the booster 33 is not particularly limited, for example, any of known boosters, such as Lysholm type, Roots type, or centrifugal type, may be used as the booster 33.

An electromagnetic clutch 34 electrically switchable of its operation mode between "engaged" and "disengaged" is provided between the booster 33 and the engine body 1. When the electromagnetic clutch 34 is engaged, a driving force is transmitted from the engine body 1 to the booster 33 to enter a boosting state where boost by the booster 33 is performed. On the other hand, when the electromagnetic clutch 34 is disengaged, the transmission of the driving force is interrupted to enter a non-boosting state where the boost by the booster 33 is stopped.

A bypass passage 38 which bypasses the booster 33 is provided in the intake passage 30. The bypass passage 38 connects the surge tank 36 to the EGR passage 51 described later. A bypass valve 39 is provided in the bypass passage 38.

The exhaust passage 40 is connected to the other side surface of the cylinder head 4 so as to communicate with the exhaust port 10. Burnt gas (exhaust gas) generated in the combustion chamber 6 is discharged outside through the exhaust port 10 and the exhaust passage 40.

A catalytic converter 41 is provided in the exhaust passage 40. The catalytic converter 41 is built therein with a three-way catalyst 41a which purifies hazardous components contained within the exhaust gas flowing through the exhaust passage 40 (HC, CO and $NO_x$), and a GPF (gasoline-particulate filter) 41b which captures particulate matter (PM) contained within the exhaust gas. Note that another catalytic converter built therein with a suitable catalyst, such as a three-way catalyst or a $NO_x$ catalyst, may be added downstream of the catalytic converter 41.

A linear $O_2$ sensor SN10 which detects the concentration of oxygen contained within the exhaust gas is provided in a portion of the exhaust passage 40 upstream of the catalyst converter 41. The linear $O_2$ sensor SN10 linearly changes its output value according to the oxygen concentration and an air-fuel ratio of the mixture gas is estimatable based on the output value of the linear $O_2$ sensor SN10.

The external EGR device 50 has the EGR passage 51 connecting the exhaust passage 40 to the intake passage 30, and an EGR cooler 52 and an EGR valve 53 provided in the EGR passage 51. The EGR passage 51 connects a portion of the exhaust passage 40 downstream of the catalytic converter 41 to a portion of the intake passage 30 between the throttle valve 32 and the booster 33. The EGR cooler 52 cools the exhaust gas recirculated from the exhaust passage 40 to the intake passage 30 through the EGR passage 51 by heat exchange. The EGR valve 53 is provided in the EGR passage 51 downstream of the EGR cooler 52 (the side close to the intake passage 30), and adjusts the flow rate of the exhaust gas flowing through the EGR passage 51. Hereinafter, the exhaust gas recirculated from the exhaust passage 40 into the combustion chamber 6 (cylinder 2) through the EGR passage 51 is referred to as the external EGR gas.

A pressure difference sensor SN9 which detects a difference between pressure upstream of the EGR valve 53 and pressure downstream thereof is provided in the EGR passage 51.

(2) Control System

Figure 4:
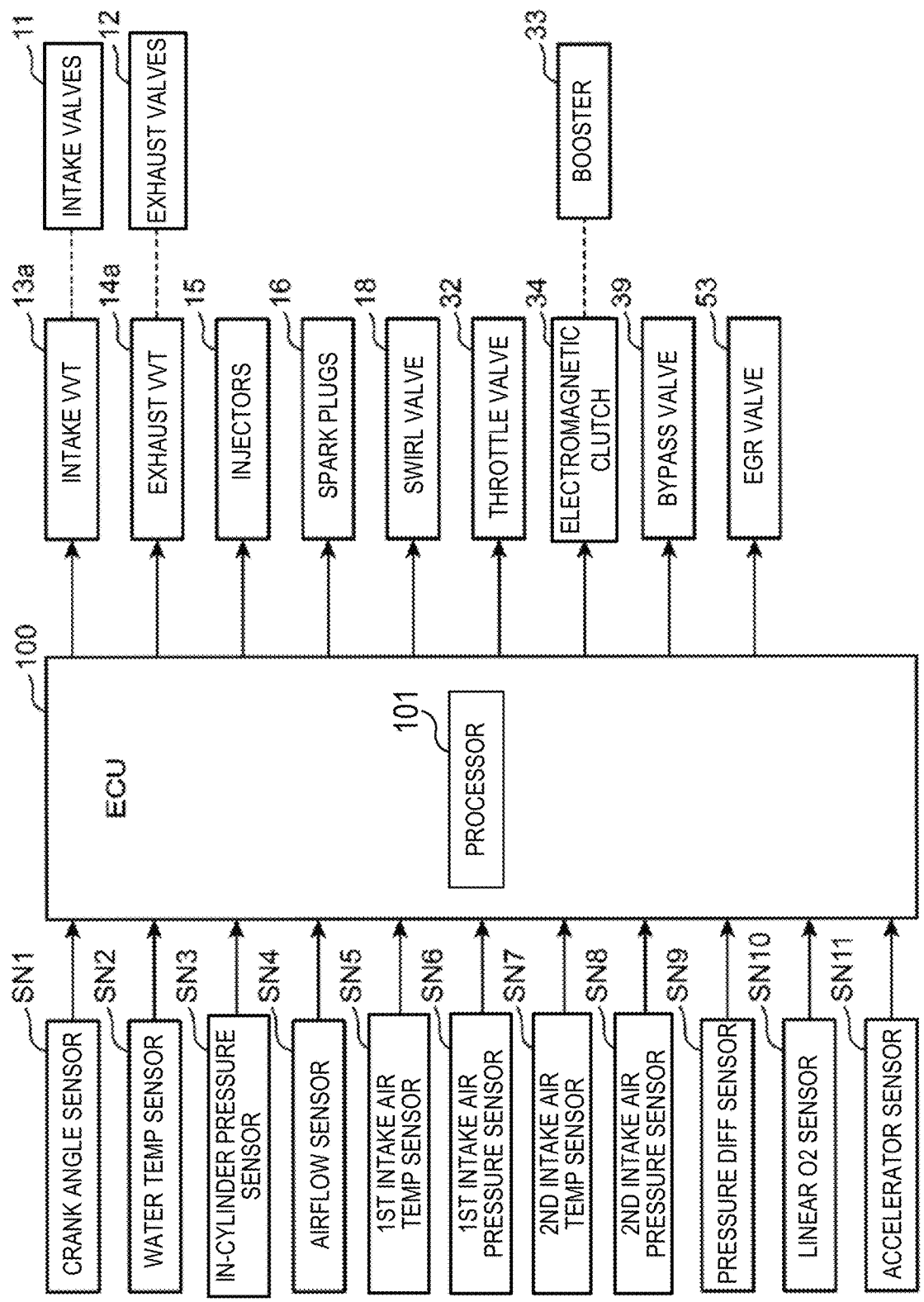
FIG. 4 is a block diagram illustrating a control system of the engine.

FIG. 4 is a block diagram illustrating a control system of the engine. An ECU (electronic control unit) 100 illustrated in FIG. 4 is a microprocessor which comprehensively controls the engine, and comprised of a well-known processor 101 (e.g. central processing unit (CPU)) having associated ROM and RAM, etc.

The ECU 100 receives detection signals from various sensors. For example, the ECU 100 is electrically connected to the crank angle sensor SN1, the water temperature sensor SN2, the in-cylinder pressure sensor SN3, the airflow sensor SN4, the first and second intake air temperature sensors SN5 and SN7, the first and second intake air pressure sensors SN6 and SN8, the pressure difference sensor SN9, and the linear $O_2$ sensor SN10, which are described above. The ECU 100 sequentially receives the information detected by these sensors (i.e., the crank angle, the engine speed, the engine water temperature, the in-cylinder pressure, the intake air flow rate, the intake air temperatures, the intake air pressures, the difference in pressure between the upstream and downstream sides of the EGR valve 53, the oxygen concentration of the exhaust gas, etc.).

Further, an accelerator sensor SN11 which detects an opening of an accelerator pedal controlled by a vehicle driver driving the vehicle is provided in the vehicle, and a detection signal from the accelerator sensor SN11 is also inputted to the ECU 100.

The ECU 100 controls various components of the engine while executing various determinations and calculations based on the input signals from the various sensors. That is, the ECU 100 is electrically connected to the intake VVT 13a, the exhaust VVT 14a, the injector 15, the spark plug 16, the swirl valve 18, the throttle valve 32, the electromagnetic clutch 34, the bypass valve 39, the EGR valve 53, etc., and outputs control signals to these components based on various calculation results. Note that the ECU 100 as described above is one example of a "controller."

(3) Control According to Operating State

Figure 5A:
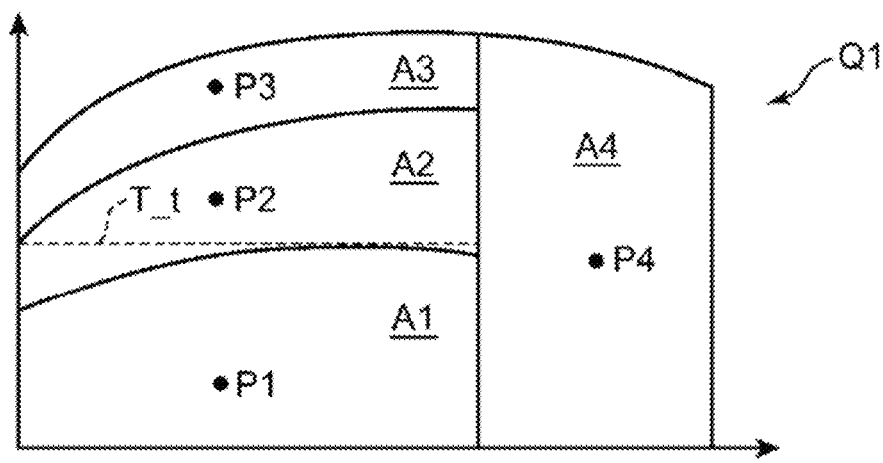
Figure 5B:
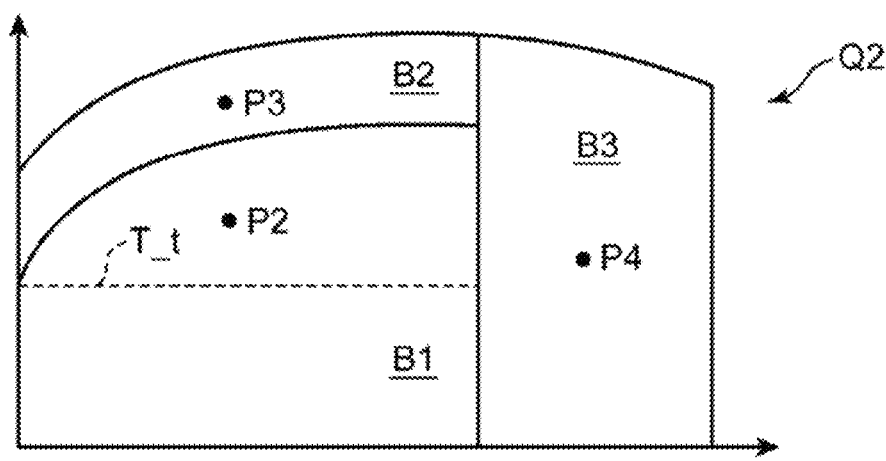
Figure 5C:
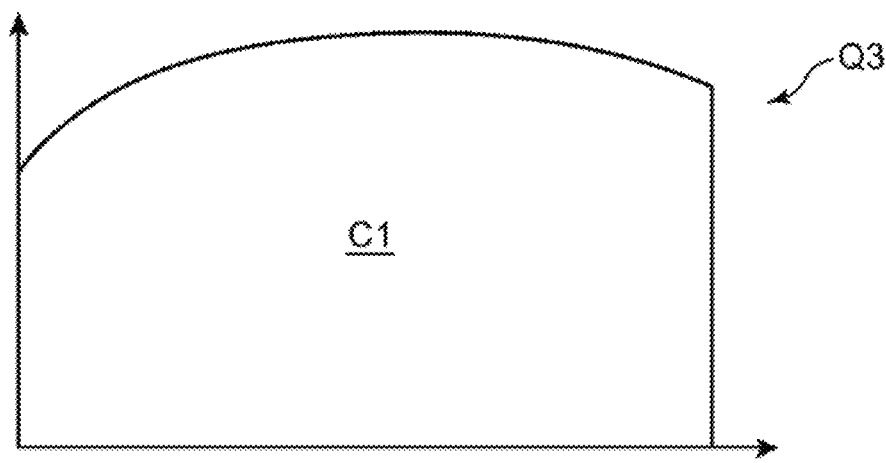

FIGS. 5A to 5C are operation maps illustrating a difference in control according to a progression of a warm-up of the engine and the engine speed and load. In this embodiment, different operation maps Q1 to Q3 are prepared corresponding to three stages including a warmed-up state where the warm-up of the engine is completed, a partially warmed-up state where the engine is in process of warming up, and a cold state where the engine is not warmed up. Hereinafter, the operation map Q1 used in the warmed-up state is referred to as the first operation map, the operation map Q2 used in the partially warmed-up state is referred to as the second operation map, and the operation map Q3 used in the cold state is referred to as the third operation map.

Note that in the below description, the engine load being high (low) is equivalent to a required torque of the engine being high (low). Further in the below description, phrases like "early stage," "middle stage," and "late stage" of a certain stroke or phrases like "early half" and "latter half" of a certain stroke may be used to specify a timing of a fuel injection or a spark-ignition, and these phrases are based on the following definitions. That is, here, three periods formed by evenly dividing any stroke, such as intake stroke or compression stroke, are defined as "early stage," "middle stage," and "late stage," respectively. Therefore, for example, (i) the early stage, (ii) the middle stage, and (iii) the late stage of the compression stroke indicate (i) a range between 180° CA and 120° CA before TDC (BTDC) of the compression stroke, (ii) a range between 120° CA and 60° CA BTDC, (iii) a range between 60° CA and 0° CA BTDC, respectively. Similarly, here, two periods formed by evenly dividing any stroke, such as the intake stroke or the compression stroke, are defined as "early half" and "latter half," respectively. Therefore, for example, (iv) the early half and (v) the latter half of the intake stroke indicate (iv) a range between 360° CA and 270° CA BTDC, and (v) a range between 270° CA and 180° CA BTDC, respectively.

Figure 6:
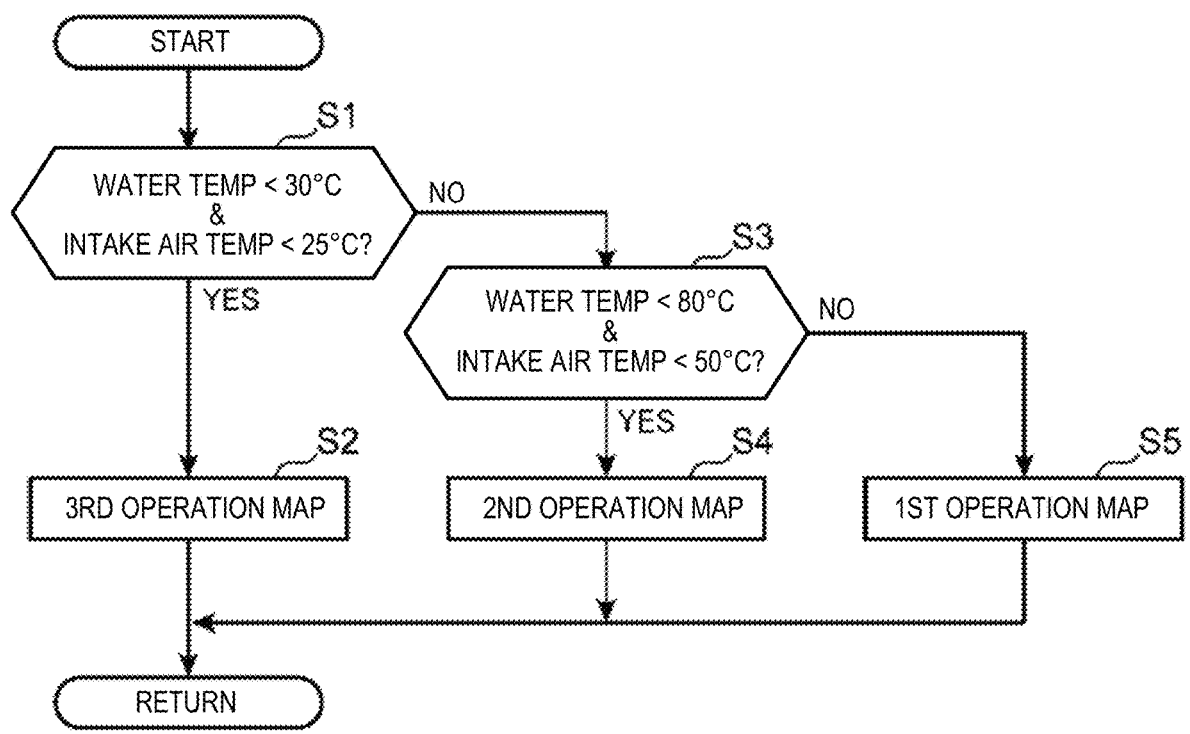
FIG. 6 is a flowchart illustrating a procedure for selecting a suitable map from the first to third operation maps.

FIG. 6 is a flowchart illustrating a procedure for selecting a suitable map from the first to third operation maps Q1 to Q3. Once the control illustrated in this flowchart is started, at S1, the ECU 100 determines whether (i) the engine water temperature is below 30° C. and (ii) the intake air temperature is below 25° C. are both satisfied, based on the engine water temperature detected by the water temperature sensor SN2 and the intake air temperature detected by the second intake air temperature sensor SN7.

If S1 is YES and it is confirmed that (i) and (ii) are satisfied, i.e., both "engine water temperature <30° C." and "intake air temperature <25° C." are satisfied and the engine is in the cold state, the ECU 100 shifts to S2 to determine the third operation map Q3 illustrated in FIG. 5C as the operation map to be used.

On the other hand, if S1 is NO and it is confirmed that at least one of (i) and (ii) is not satisfied, the ECU 100 shifts to S3 to determine whether (iii) the engine water temperature is below 80° C. and (iv) the intake air temperature is below 50° C. are both satisfied, based on the engine water temperature detected by the water temperature sensor SN2 and the intake air temperature detected by the second intake air temperature sensor SN7.

If S3 is YES and it is confirmed that (iii) and (iv) are satisfied, i.e., at least one of "engine water temperature ≥30° C." and "intake air temperature ≥25° C." is satisfied, and both "engine water temperature <80° C." and "intake air temperature <50° C." are satisfied, which means that the engine is in the partially warmed-up state, the ECU 100 shifts to S4 to determine the second operation map Q2 illustrated in FIG. 5B as the operation map to be used.

On the other hand, if S3 is NO and it is confirmed that at least one of (iii) and (iv) is not satisfied, i.e., at least one of "engine water temperature ≥80° C." and "intake air temperature ≥50° C." is satisfied, which means that the engine is in the warmed-up state (warm-up completed state), the ECU 100 shifts to S5 to determine the first operation map Q1 illustrated in FIG. 5A as the operation map to be used.

Next, details of controls (a difference in combustion control according to the engine speed/load) defined by the operation maps Q1 to Q3 in the cold state, the partially warmed-up state, and the warmed-up state are described, respectively.

(3-1) Control in Cold State

A combustion control in the cold state of the engine is described with reference to the third operation map Q3 (FIG. 5C). In the cold state of the engine, a control for mixing the fuel with air to form the mixture gas and performing SI combustion with the mixture gas is executed within an entire operating range C1. The explanation of the control in the cold state is omitted since it is similar to the combustion control of a general gasoline engine.

(3-2) Control in Partially Warmed-Up State

A combustion control in the partially warmed-up state of the engine is described based on the second operation map Q2 (FIG. 5B). As illustrated in FIG. 5B, when the engine is in the partially warmed-up state, the operating range of the engine is mainly divided into three operating ranges B1 to B3. When the three ranges are a first partially warmed-up range B1, a second partially warmed-up range B2, and a third partially warmed-up range B3, the third partially warmed-up range B3 is a high engine speed range. The first partially warmed-up range B1 is a low and medium speed, low load range extending on the lower speed side of the third partially warmed-up range B3, excluding the high load side. The second partially warmed-up range B2 is a range other than the first and third partially warmed-up ranges B1 and B3 (i.e., a low and medium speed, high load range).

(a) First Partially Warmed-Up Range

Within the first partially warmed-up range B1, the SPCCI combustion combining the SI combustion and the CI combustion is performed. The SI combustion is a mode in which the mixture gas is ignited by the spark plug 16 and is then forcibly combusted by flame propagation which spreads the combusting region from the ignition point, and the CI combustion is a mode in which the mixture gas is combusted by self-ignition in an environment increased in temperature and pressure due to the compression of the piston 5. The SPCCI combustion combining the SI combustion and the CI combustion is a combustion mode in which the SI combustion is performed on a portion of the mixture gas inside the combustion chamber 6 by the spark-ignition performed in an environment immediately before the mixture gas self-ignites, and after the SI combustion, the CI combustion is performed on the remaining mixture gas in the combustion chamber 6 by self-ignition (by the further increase in temperature and pressure accompanying the SI combustion). Note that "SPCCI" is an abbreviation of "SPark Controlled Compression Ignition" and the SPCCI combustion is one example of "partial compression-ignition combustion."

Figure 7:
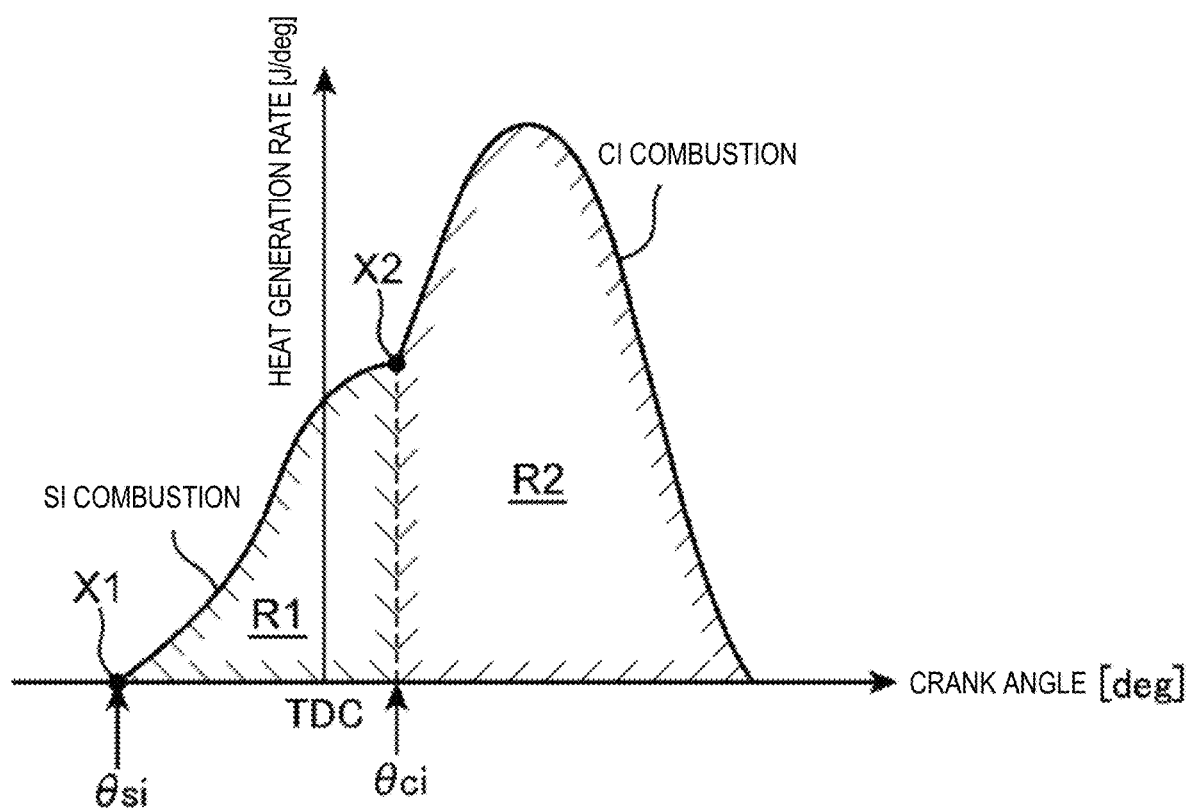
FIG. 7 is a chart illustrating a waveform of a heat generation rate in SPCCI combustion.

The SPCCI combustion has a characteristic that the heat generation in the CI combustion is faster than that in the SI combustion. For example, as illustrated in FIG. 7 described later, a waveform of a heat generation rate caused by SPCCI combustion has a shape in which a rising slope in an early stage of the combustion which corresponds to SI combustion is shallower than a rising slope caused corresponding to CI combustion occurring subsequently. In other words, the waveform of the heat generation rate caused by SPCCI combustion is formed to have a first heat generation rate portion formed by SI combustion and having a relatively shallow rising slope, and a second heat generation rate portion formed by CI combustion and having a relatively steep rising slope, which are next to each other in this order. Further, corresponding to the tendency of such a heat generation rate, in SPCCI combustion, a pressure rise rate (dp/dθ) inside the combustion chamber 6 caused by SI combustion is lower than that in CI combustion.

When the temperature and pressure inside the combustion chamber 6 rise due to SI combustion, the unburnt mixture gas self-ignites and CI combustion starts. As illustrated in FIG. 7, the slope of the waveform of the heat generation rate changes from shallow to steep at the timing of self-ignition (that is, the timing when CI combustion starts). That is, the waveform of the heat generation rate caused by SPCCI combustion has a flection point at a timing when CI combustion starts (indicated by an "X2" in FIG. 7).

After CI combustion starts, SI combustion and CI combustion are performed in parallel. In CI combustion, since the combustion speed of the mixture gas is faster than that in SI combustion, the heat generation rate becomes relatively high. However, since CI combustion is performed after TDC of compression stroke, the slope of the waveform of the heat generation rate does not become excessive. That is, after TDC of compression stroke, since the motoring pressure decreases due to the piston 5 descending, the rise of the heat generation rate is prevented, which avoids excessive dp/dθ in CI combustion. In SPCCI combustion, due to CI combustion being performed after SI combustion as described above, it is unlikely for dp/dθ which is an index of combustion noise to become excessive, and combustion noise is reduced compared to performing CI combustion alone (in the case where CI combustion is performed on all of the fuel).

SPCCI combustion ends as CI combustion finishes. Since the combustion speed of CI combustion is faster than that of SI combustion, the combustion end timing is advanced compared to performing SI combustion alone (in the case where SI combustion is performed on all the fuel). In other words, SPCCI combustion brings the combustion end timing closer to TDC of compression stroke, on the expansion stroke. Thus, SPCCI combustion improves fuel efficiency compared to SI combustion alone.

Within the first partially warmed-up range B1, when the spark plug 16 performs the ignition (when the mixture gas starts to combust), an environment in which the burnt gas (combusted gas) exists within the combustion chamber 6, a gas-fuel ratio (G/F) which is a weight ratio between the entire gas (G) and the fuel (F) within the combustion chamber 6 (cylinder 2) is increased to be higher than a stoichiometric air-fuel ratio (14.7:1), and an air-fuel ratio (A/F) which is a ratio between the air (A) and the fuel (F) within the combustion chamber 6 (cylinder 2) substantially matches the stoichiometric air-fuel ratio (hereinafter, referred to as G/F lean environment) is formed and a control for performing SPCCI combustion of the mixture gas is executed. More specifically, the gas-fuel ratio (G/F) is $18:1 \leq G/F \leq 50:1$. By setting this range, the stability of SI combustion is secured, the controllability of the start timing of CI combustion is secured, and combustion noise is also reduced.

In order to achieve SPCCI combustion in such a G/F lean environment, within the first partially warmed-up range B1, various components of the engine are controlled by the ECU 100 as follows.

Figure 8:
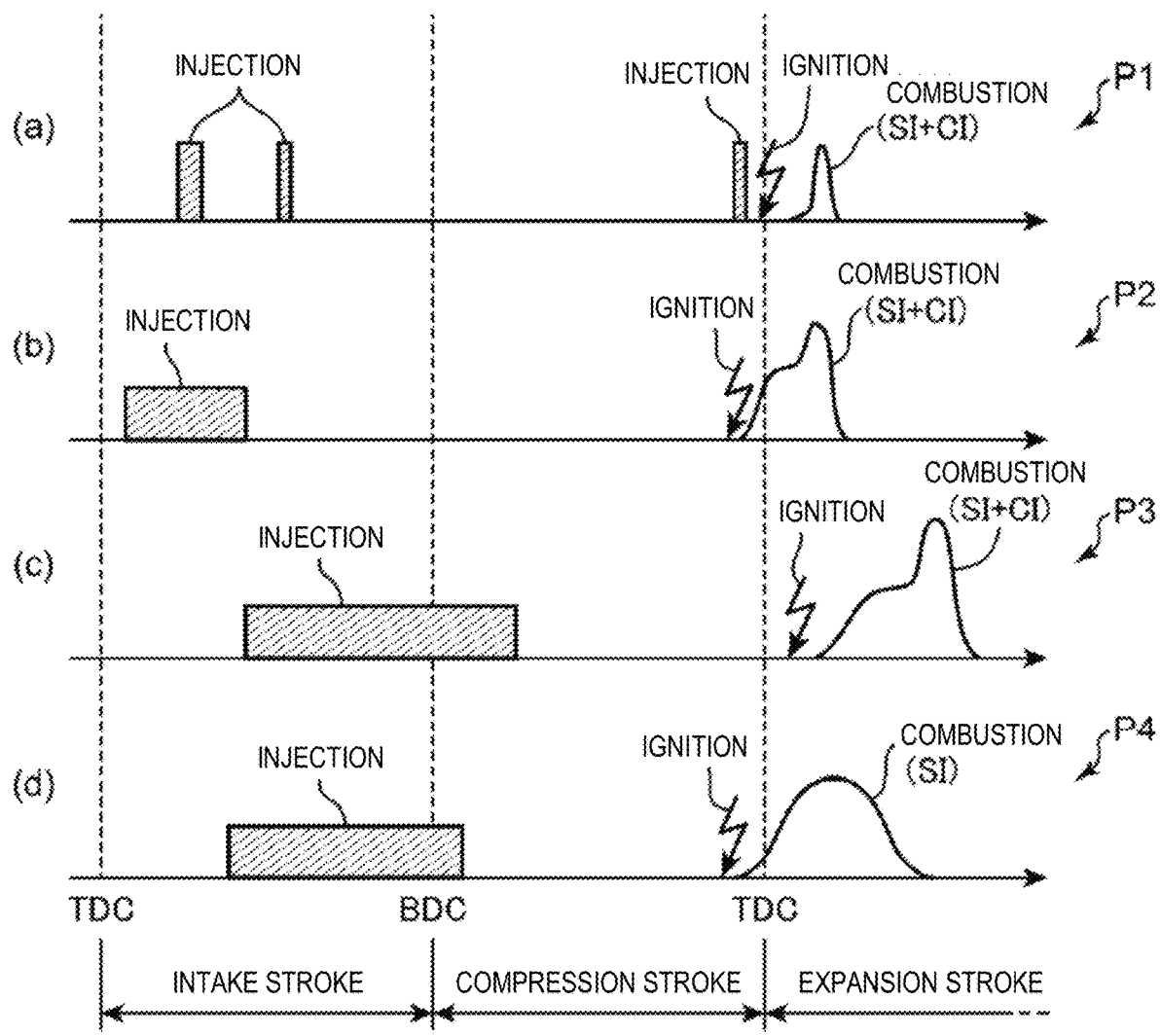
FIG. 8 shows time charts schematically illustrating a combustion control executed in respective operating ranges of the engine.

The injector 15 performs at least a single fuel injection on the intake stroke. For example, at an operation point P2 within the first partially warmed-up range B1, the injector 15 performs the single fuel injection for supplying the entire amount of fuel to be injected in one cycle, during the intake stroke as illustrated in a chart (b) of FIG. 8.

The spark plug 16 ignites the mixture gas near TDC of compression stroke. For example, at the operation point P2, the spark plug 16 ignites the mixture gas at a slightly advanced timing than TDC of compression stroke. This ignition triggers SPCCI combustion, a portion of the mixture gas in the combustion chamber 6 is combusted through flame propagation (SI combustion), and then the remaining mixture gas is combusted by self-ignition (CI combustion).

The opening of the throttle valve 32 is set so that an air amount equivalent to the stoichiometric air-fuel ratio is introduced into the combustion chamber 6 through the intake passage 30, i.e., so that the air-fuel ratio (A/F) which is a weight ratio between air (fresh air) and the fuel inside the combustion chamber 6 substantially matches the stoichiometric air-fuel ratio (14.7:1). On the other hand, within the first partially warmed-up range B1, the open timing IVO of the intake valve 11, a close timing EVC of the exhaust valve 12 and the opening of the EGR valve 53 are adjusted so that the external EGR gas and/or the internal EGR gas, which is the burnt gas, flows into (remains inside) the combustion chamber 6. Thus, within the first partially warmed-up range B1, the gas-fuel ratio is increased to be higher than the stoichiometric air-fuel ratio. The internal EGR gas is, within the burnt gas generated inside the combustion chamber 6, the portion which is not the external EGR gas, in other words, it is not the burnt gas recirculated into the combustion chamber 6 through the EGR passage 51 but gas remaining inside the combustion chamber 6 without being discharged to the EGR passage 51 (including gas returned back to the combustion chamber 6 after being discharged to the intake port 9 and/or the exhaust port 10).

An opening of the EGR valve 53 is controlled to achieve a target external EGR ratio variably set within a substantial range of 0-40%. Note that the external EGR ratio used here is a weight ratio of exhaust gas recirculated to the combustion chamber 6 through the EGR passage 51 (external EGR gas) to all the gas inside the combustion chamber 6, and the target external EGR ratio is a target value of the external EGR ratio. The target external EGR ratio within the first partially warmed-up range B1 will be described later in detail.

Figure 9:
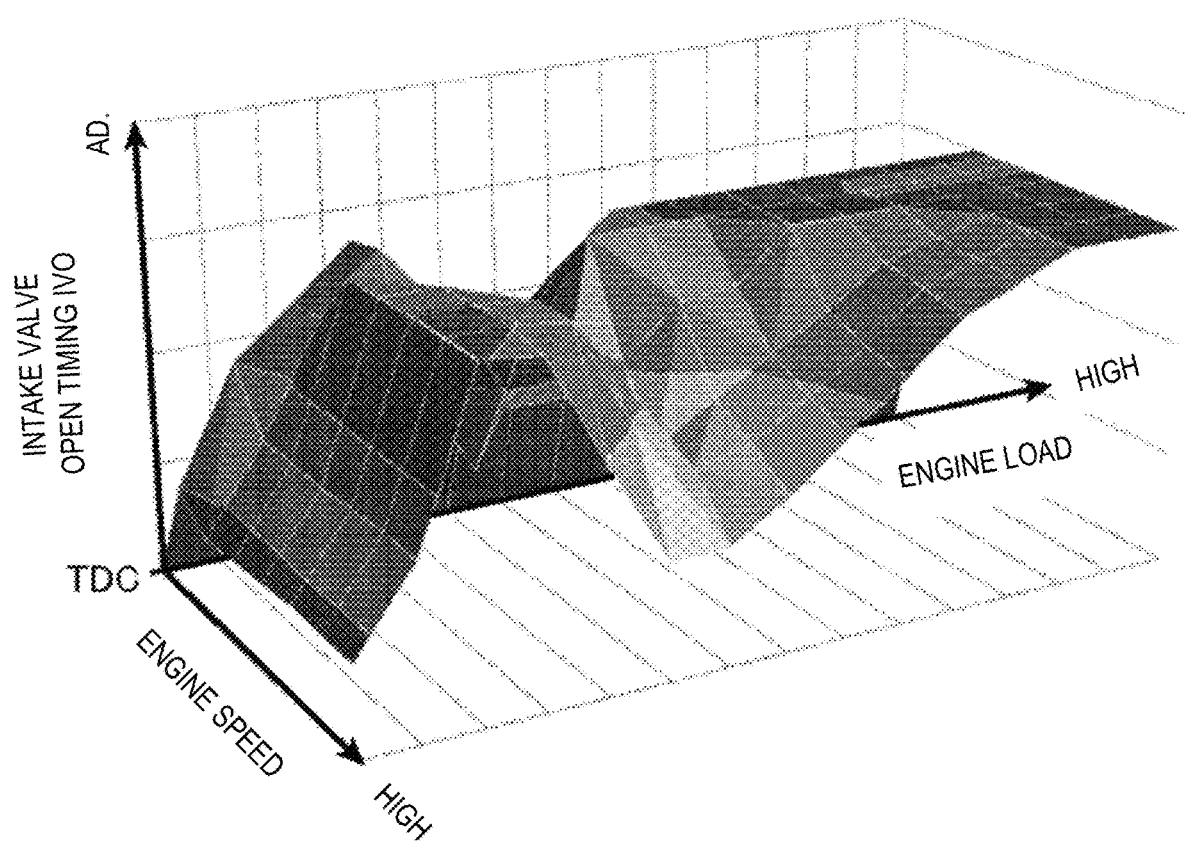
FIG. 9 is a three-dimensional map illustrating one specific example of an open timing of an intake valve set within a first partially warmed-up range.
Figure 10:
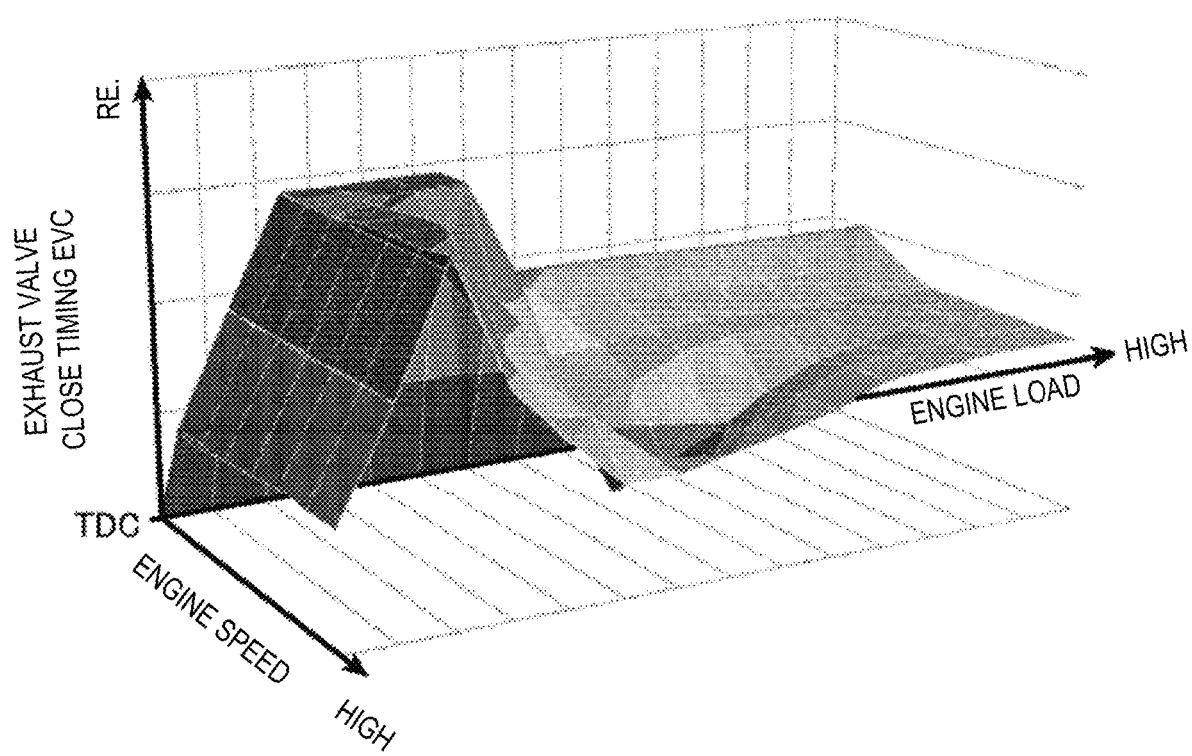
FIG. 10 is a three-dimensional map illustrating one specific example of a close timing of an exhaust valve set within the first partially warmed-up range.

The intake VVT 13a changes the open timing IVO of the intake valve 11 (intake open timing IVO) according to the engine speed and the engine load as illustrated in FIG. 9. The exhaust VVT 13a changes the close timing EVC of the exhaust valve 12 (exhaust close timing EVC) according to the engine speed and the engine load as illustrated in FIG. 10. These FIGS. 9 and 10 are three-dimensional maps illustrating specific examples of the open timing IVO of the intake valve 11 (the close timing EVC of the exhaust valve 12) with respect to the engine speed and the engine load. The open and close timings of the intake valve 11 and the close timing of the exhaust valve 12 within the first partially warmed-up range B1 will be described later in detail.

The booster 33 is in OFF state when the engine load is below a given boosting load T_t. On the other hand, within the first partially warmed-up range B1, the booster 33 is in ON state when the engine load is above the boosting load T_t. When the booster 33 is in the OFF state, the electromagnetic clutch 34 is disengaged to disconnect the booster 33 from the engine body 1 and fully open the bypass valve 39 so as to stop the boost by the booster 33 (enter a non-boosting state). On the other hand, when the booster 33 is in the ON state, the electromagnetic clutch 34 is engaged to connect the booster 33 to the engine body 1 so as to boost by the booster 33 (enter a boosting state). Here, the opening of the bypass valve 39 is controlled so that the pressure in the surge tank 36 (boosting pressure) detected by the second intake air pressure sensor SN7 matches a given target pressure determined for each operating condition of the engine (a condition such as the engine speed and the engine load). For example, as the opening of the bypass valve 39 increases, the flow rate of the intake air which flows back to the upstream side of the booster 33 through the bypass passage 38 increases, and as a result, the pressure of the intake air introduced into the surge tank 36, that is, the boosting pressure, becomes low. By adjusting the backflow amount of the intake air in this manner, the bypass valve 39 controls the boosting pressure to the target pressure.

Within the first partially warmed-up range B1, the opening of the swirl valve 18 is adjusted to form a relatively weak swirl flow. For example, the swirl valve 18 is set to be about half open (50%) or have a larger opening.

(b) Second Partially Warmed-Up Range

Within the second partially warmed-up range B2, the control for performing SPCCI combustion of the mixture gas is executed in the environment in which the air-fuel ratio inside the combustion chamber 6 is slightly richer (an excess air ratio λ≤1) than the stoichiometric air-fuel ratio. In order to achieve SPCCI combustion in such a rich environment, within the second partially warmed-up range B2, various components of the engine are controlled by the ECU 100 as follows.

The injector 15 injects all or majority of the fuel for one combustion cycle, during the intake stroke. For example, at an operation point P3 within the second partially warmed-up range B2, the injector 15 injects the fuel over a continuous period overlapping with a latter half of the intake stroke, more specifically, a continuous period from the latter half of the intake stroke to an early half of the compression stroke, as illustrated in the chart (c) of FIG. 8.

The spark plug 16 ignites the mixture gas near TDC of compression stroke. For example, at the operation point P3, the spark plug 16 ignites the mixture gas at a slightly retarded timing than TDC of compression stroke.

The booster 33 is controlled to be ON and performs the boost. The boosting pressure here is adjusted by the bypass valve 39.

The intake VVT 13a and the exhaust VVT 14a set valve operation timings of the intake and exhaust valves 11 and 12 so that the internal EGR gas does not remain inside the combustion chamber 6 (the internal EGR is substantially stopped). The throttle valve 32 is fully opened. The opening of the EGR valve 53 is controlled so that the air-fuel ratio (A/F) in the combustion chamber 6 becomes the stoichiometric air-fuel ratio or slightly richer (λ≤1). For example, the EGR valve 53 adjusts the amount of the exhaust gas recirculated through the EGR passage 51 (external EGR gas) so that the air-fuel ratio becomes between 12:1 and 14:1. Note that near the highest engine load, the EGR valve 53 may be closed to substantially stop the external EGR. The swirl valve 18 is set to have an intermediate opening which is larger than that within the first partially warmed-up range B1 but smaller than a largest (full) opening.

(c) Third Partially Warmed-Up Range

Within the third partially warmed-up range B3, a relatively traditional SI combustion is performed. In order to achieve the SI combustion, within the third partially warmed-up range B3, various components of the engine are controlled by the ECU 100 as follows.

The injector 15 at least injects the fuel over a given period overlapping with the intake stroke. For example, at an operation point P4 within the third partially warmed-up range B3, the injector 15 injects the fuel over a continuous period from the intake stroke to the compression stroke, as illustrated in the chart (d) of FIG. 8.

The spark plug 16 ignites the mixture gas near TDC of compression stroke. For example, at the operation point P4, the spark plug 16 ignites the mixture gas at a slightly advanced timing than TDC of compression stroke. Further, this ignition triggers the SI combustion, and all of the mixture gas in the combustion chamber 6 combusts through flame propagation.

The booster 33 is controlled to be ON and performs the boost. The boosting pressure here is adjusted by the bypass valve 39. The throttle valve 32 is fully opened. The opening of the EGR valve 53 is controlled so that the air-fuel ratio (A/F) in the combustion chamber 6 becomes the stoichiometric air-fuel ratio or slightly richer (λ≤1). The swirl valve 18 is fully opened. Thus, not only the first intake port 9A is but also the second intake port 9B is fully opened and charging efficiency of the engine improves.

(3-3) Control in Warmed-Up State

As illustrated in FIG. 5A, when the engine is in the warmed-up state, the operating range of the engine is mainly divided into four operating ranges A1 to A4. When the four operating ranges are a first warmed-up range A1, a second warmed-up range A2, a third warmed-up range A3 and a fourth warmed-up range A4, the second warmed-up range A2 corresponds to a high load segment of the first partially warmed-up range B1, the first warmed-up range A1 corresponds to the first partially warmed-up range B1 without the second warmed-up range A2, the third warmed-up range A3 corresponds to the second partially warmed-up range B2, and the fourth warmed-up range A4 corresponds to the third partially warmed-up range B3.

(a) First Warmed-Up Range

Within the first warmed-up range A1, a control is executed in which SPCCI combustion of the mixture gas is performed while setting the A/F higher than the stoichiometric air-fuel ratio (14.7:1), so as to keep an amount of $NO_x$ generated by the combustion small and improve fuel efficiency. That is, SPCCI combustion is performed while setting the excess air ratio λ>1 inside the combustion chamber 6. The A/F within the first warmed-up range A1 is set variably, for example within a range of 20 to below 35, so that the amount of $NO_x$ generated by the combustion is kept sufficiently small. A target air-fuel ratio within the first warmed-up range A1 is generally set to be higher as the engine load (required torque) increases.

In order to achieve SPCCI combustion in such an environment where the air-fuel ratio is higher than the stoichiometric air-fuel ratio (hereinafter, suitably referred to as an "A/F lean environment"), within the first warmed-up range A1, various components of the engine are controlled by the ECU 100 as follows.

The injector 15 injects the fuel by splitting it into a plurality of injections from the intake stroke to the compression stroke. For example, at an operation point P1 at which the engine speed and load are relatively low within the first warmed-up range A1, the injector 15 injects majority of the fuel for one cycle separately in two times from an early stage to a middle stage of the intake stroke and the remaining fuel in a final stage of the compression stroke (a total of three injections), as illustrated in the chart (a) of FIG. 8.

The spark plug 16 ignites the mixture gas near TDC of compression stroke. For example, at the operation point P1, the spark plug 16 ignites the mixture gas at a slightly advanced timing than TDC of compression stroke. This ignition triggers SPCCI combustion, a portion of the mixture gas in the combustion chamber 6 is combusted through flame propagation (SI combustion), and then the remaining mixture gas is combusted by self-ignition (CI combustion).

The booster 33 is in the OFF state within the substantially entire first warmed-up range A1. The throttle valve 32 is fully opened or has a similar opening within the entire first warmed-up range A1. Thus, a large amount of air is introduced into the combustion chamber 6 to increase the air-fuel ratio inside the combustion chamber 6.

Figure 11:
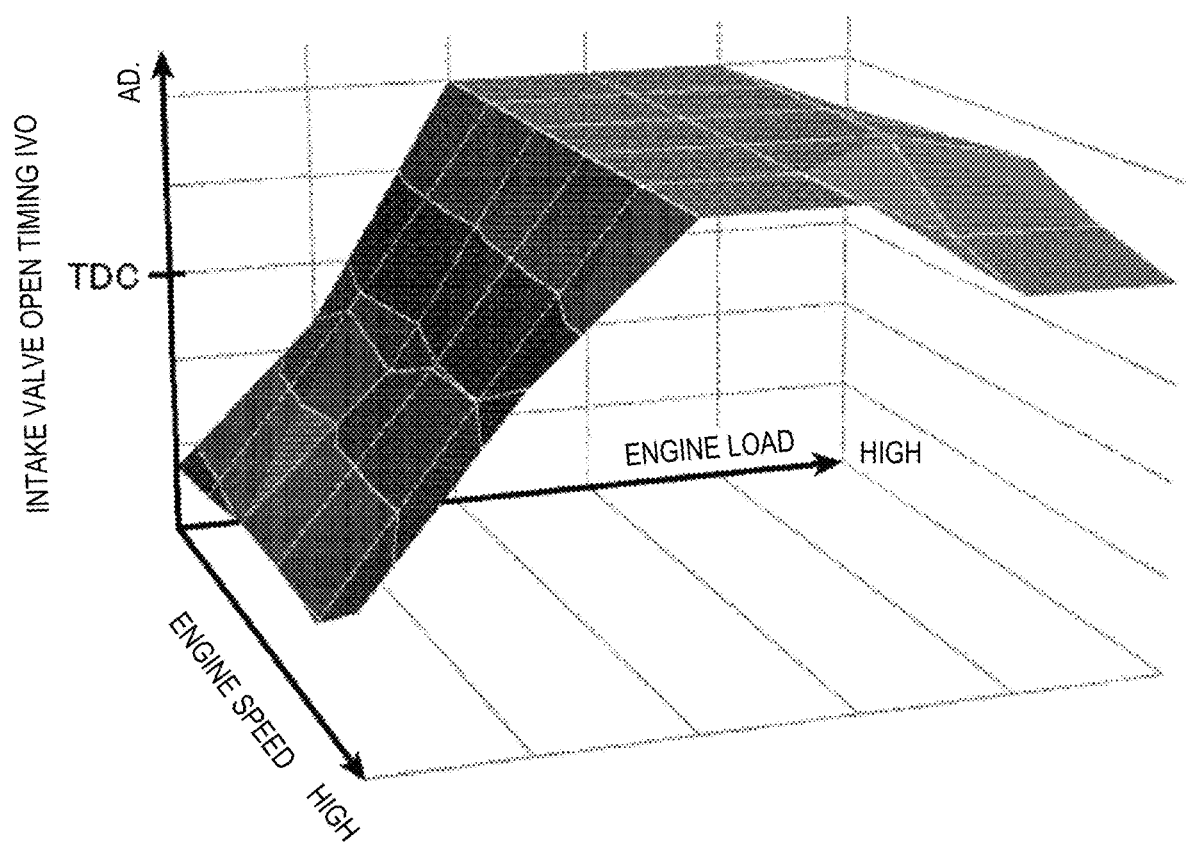
FIG. 11 is a three-dimensional map illustrating one specific example of the open timing of the intake valve set within a first warmed-up range.

The intake VVT 13a changes the open timing IVO of the intake valve 11 according to the engine speed and the engine load as illustrated in FIG. 11.

Specifically, substantially within a low load range where the engine load is low, the open timing IVO of the intake valve 11 is advanced as the engine load increases. For example, the intake open timing IVO is set to be retarded than TDC of the exhaust stroke at a lowest engine load and is advanced to a most advanced timing as the engine load increases. Further, within a medium load range where the engine load is relatively high, the intake open timing IVO is kept at the most advanced timing regardless of the engine load. Moreover, within a high load range where the engine load is even higher, the intake open timing IVO is retarded as the engine load increases on a more advancing side of TDC of the exhaust stroke. Note that similar to the intake open timing IVO, the close timing IVC of the intake valve 11 is changed with respect to the engine load on a more retarding side of the BDC of the intake stroke.

Figure 12:
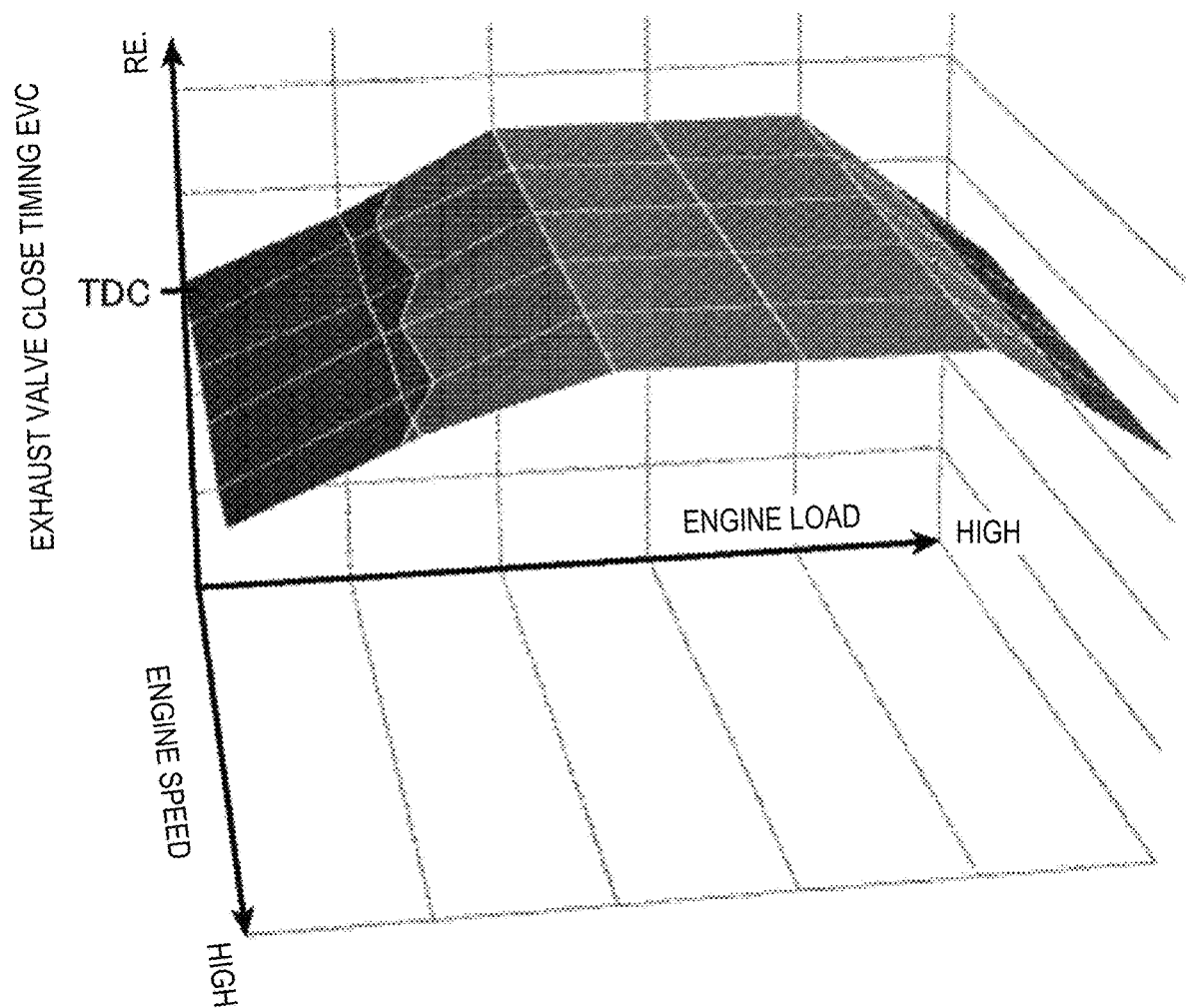
FIG. 12 is a three-dimensional map illustrating one specific example of the close timing of the exhaust valve set within the first warmed-up range.

The exhaust VVT 14a changes the close timing EVC of the exhaust valve 12 according to the engine speed and the engine load as illustrated in FIG. 12.

Specifically, the exhaust close timing EVC is set on the retarding side of TDC of the exhaust stroke. Further, within the low load range, the exhaust close timing EVC is retarded as the engine load increases. For example, the exhaust close timing EVC is set to TDC of the exhaust stroke at the lowest engine load, and its retarded amount from TDC of the exhaust stroke is increased as the engine load increases. Moreover, within the medium load range, the exhaust close timing EVC is kept fixed regardless of the engine load. Furthermore, within the high load range, the exhaust close timing EVC is advanced as the engine load increases. Note that the open timing EVO of the exhaust valve 12 is changed with respect to the engine load similarly to the exhaust close timing EVC.

The opening of the EGR valve 53 is controlled to achieve a target external EGR ratio variably set within a substantial range of 0-20%. The target external EGR ratio is increased as the engine speed or the engine load increases.

Within the first warmed-up range A1, the opening of the swirl valve 18 is set smaller than the half-opened state (50%). By reducing the opening of the swirl valve 18 as above, the majority of the intake air introduced into the combustion chamber 6 is from the first intake port 9A (the intake port on the side where the swirl valve 18 is not provided), and a strong swirl flow is formed inside the combustion chamber 6. This swirl flow grows during the intake stroke and remains until the middle of the compression stroke, to promote stratification of the fuel. That is, a concentration difference that the fuel in the center portion of the combustion chamber 6 concentrates more than outside thereof (outer circumferential portion) is formed. For example, within the first warmed-up range A1, the air-fuel ratio in the center portion of the combustion chamber 6 is set between 20:1 and 30:1 by the effect of the swirl flow, and the air-fuel ratio in the outer circumferential portion of the combustion chamber 6 is set to 35:1 or higher. Within the first warmed-up range A1, a target swirl opening is variably set to substantially 20-40%, and its value is increased as the engine speed or the engine load increases.

Note that the swirl ratio of the swirl valve 18 of the engine of this embodiment is set slightly higher than 1.5:1 when its opening is 40%, and when the swirl valve 18 is fully closed (0%), the swirl ratio is increased to approximately 6:1. "Swirl ratio" is defined as a value obtained by dividing a value which is obtained from measuring an intake flow lateral angular speed for each valve lift and integrating the value, by an angular speed of a crankshaft. As described above, the opening of the swirl valve 18 is substantially controlled between 20 and 40% during the operation within the first warmed-up range A1. From this, in this embodiment, the opening of the swirl valve 18 within the first warmed-up range A1 is set so that the swirl ratio inside the combustion chamber 6 becomes 1.5 or higher.

(b) Second Warmed-Up Range

Within the second warmed-up range A2, similar to the first partially warmed-up range B1, the control for performing SPCCI combustion of the mixture gas is executed in the environment in which the air-fuel ratio inside the combustion chamber 6 is substantially the stoichiometric air-fuel ratio ($\lambda=1$). Since the control within the second warmed-up range A2 is basically similar to the control described in (3-2(a)) (the control within the first partially warmed-up range B1), its description is omitted here.

(c) Third Warmed-Up Range

Within the third warmed-up range A3, similar to the second partially warmed-up range B2, the control for performing SPCCI combustion of the mixture gas is executed in the environment in which the air-fuel ratio inside the combustion chamber 6 is slightly richer than the stoichiometric air-fuel ratio ($\lambda \leq 1$). Since the control within the third warmed-up range A3 is basically similar to the control described in (3-2(b)) (the control within the second partially warmed-up range B2), its description is omitted here.

(d) Fourth Warmed-Up Range

Within the fourth warmed-up range A4, similar to the third partially warmed-up range B3, relatively traditional SI combustion is performed. Since the control within the fourth warmed-up range A4 is basically similar to the control described in (3-2(c)) (the control within the third partially warmed-up range B3), its description is omitted here.

(4) Setting of Open and Close timings of Intake Valve and Exhaust Valve Within First Partially Warmed-Up Range The open and close timings of the intake valve 11 and the exhaust valve 12 set within the first partially warmed-up range B1 (within an execution range of SPCCI combustion in a G/F lean environment) are described in detail.

(a) Open and Close Timings of Intake Valve

Figure 13:
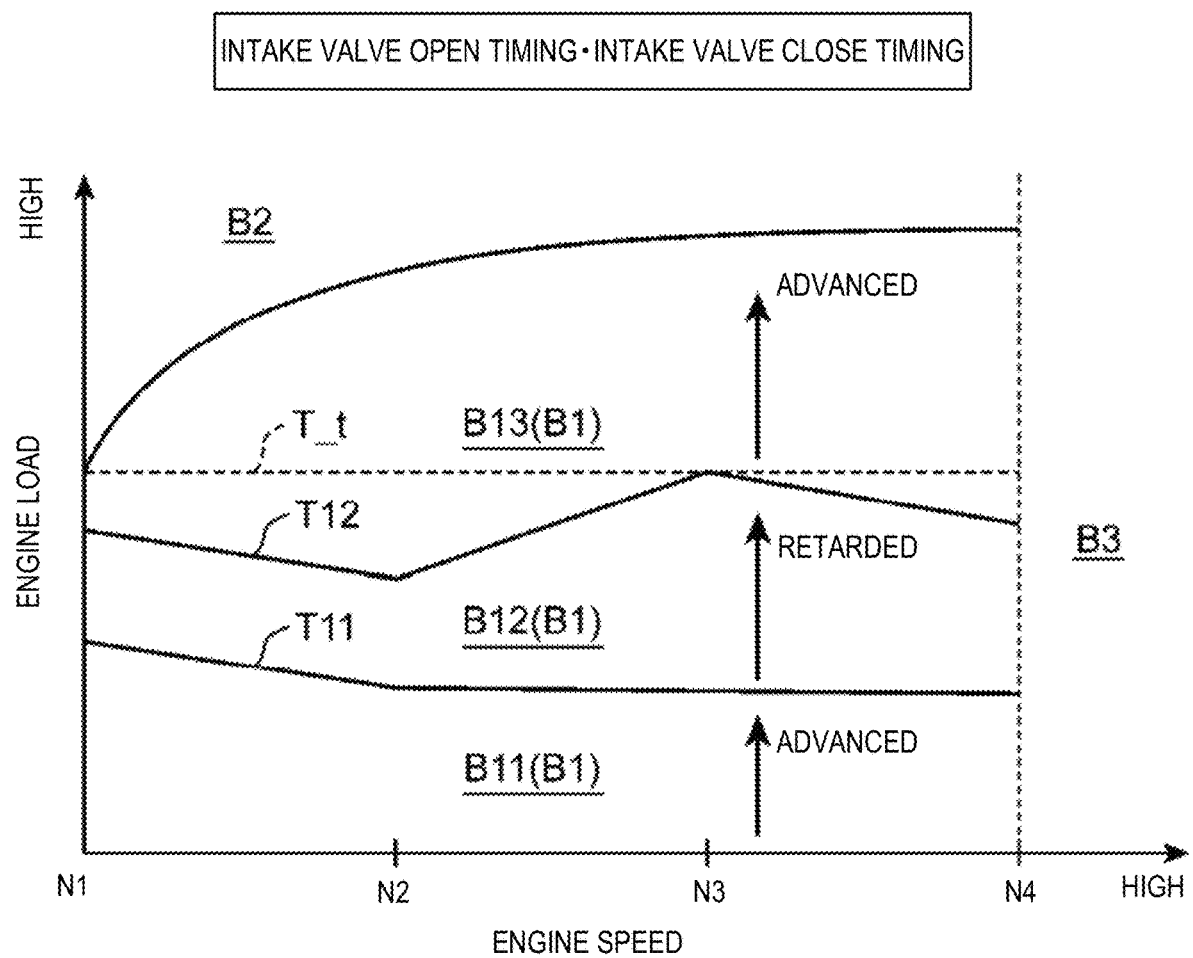
FIG. 13 is an operation map within the first partially warmed-up range divided into a plurality of sections based on the open and close timings of the intake valve.

FIG. 13 is an operation map within the first partially warmed-up range B1 divided into a plurality of sections based on the open and close timings of the intake valve 11.

As illustrated in FIG. 13, the first partially warmed-up range B1 is mainly divided into three partial ranges B11 to B13 based on the open and close timings of the intake valve 11. When the three ranges are the first partial range B11, the second partial range B12, and the third partial range B13, the first partial range B11 is a low load range where the engine load is below a given first load T11, the third partial range B13 is a high load range where the engine load is higher than a given second load T12, and the second partial range B12 is a medium load range which covers the rest of engine loads.

Here, the first partially warmed-up range B1 described above corresponds to "the operating range where the partial compression-ignition combustion in the G/F lean environment is performed", the second load T12 corresponds to "first reference load", the second partial range B12 corresponds to "first operating range", and the third partial range B13 corresponds to "second operating range." Note that as described later, the second load T12 is a boundary between a load range where the intake open timing IVO is retarded as the engine load increases and a load range where the intake open timing IVO is advanced as the engine load increases.

Figure 14:
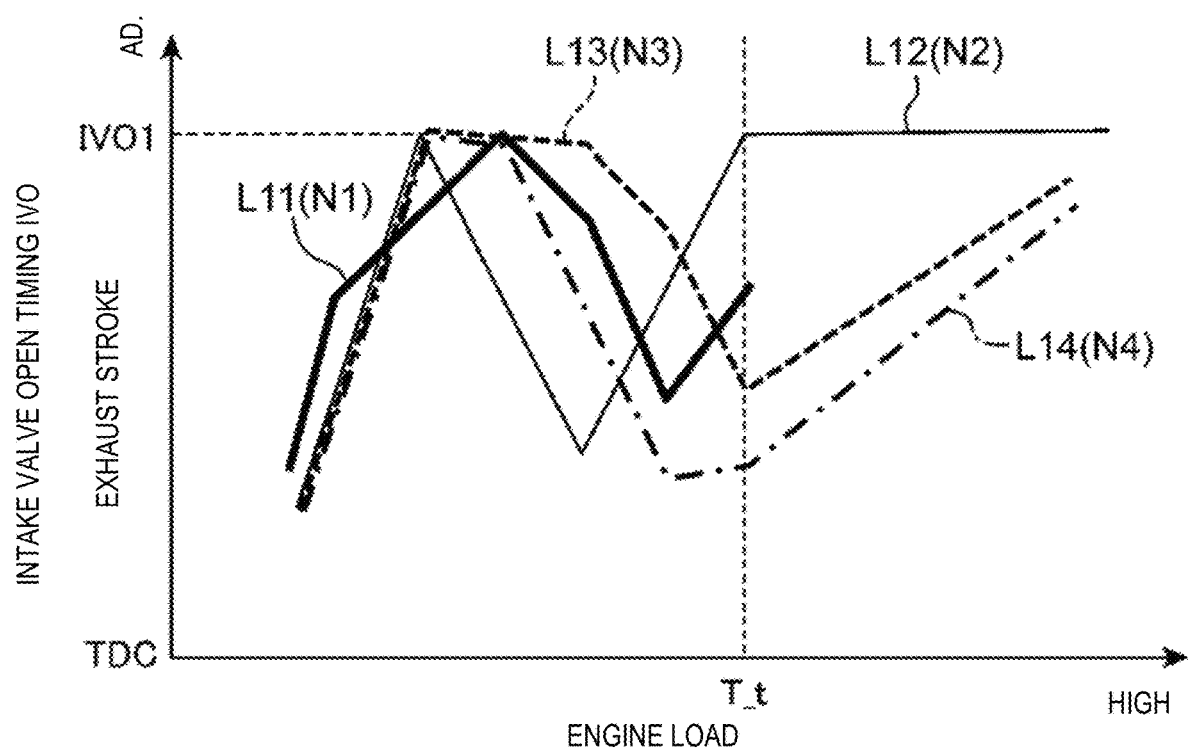
FIG. 14 is a chart illustrating a relationship between the engine load and the open timing of the intake valve set at respective engine speeds within the first partially warmed-up range.
Figure 15A:
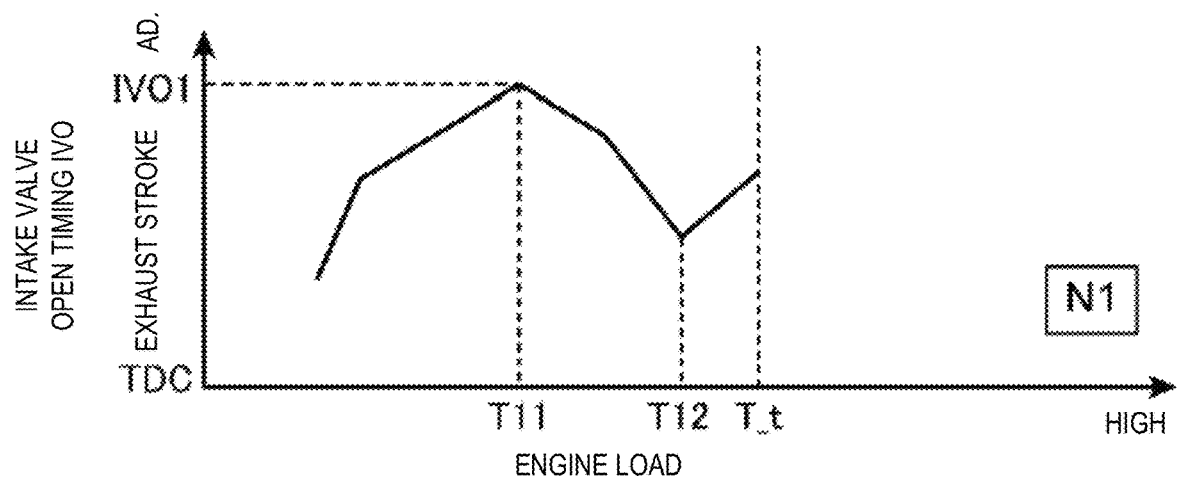
Figure 15B:
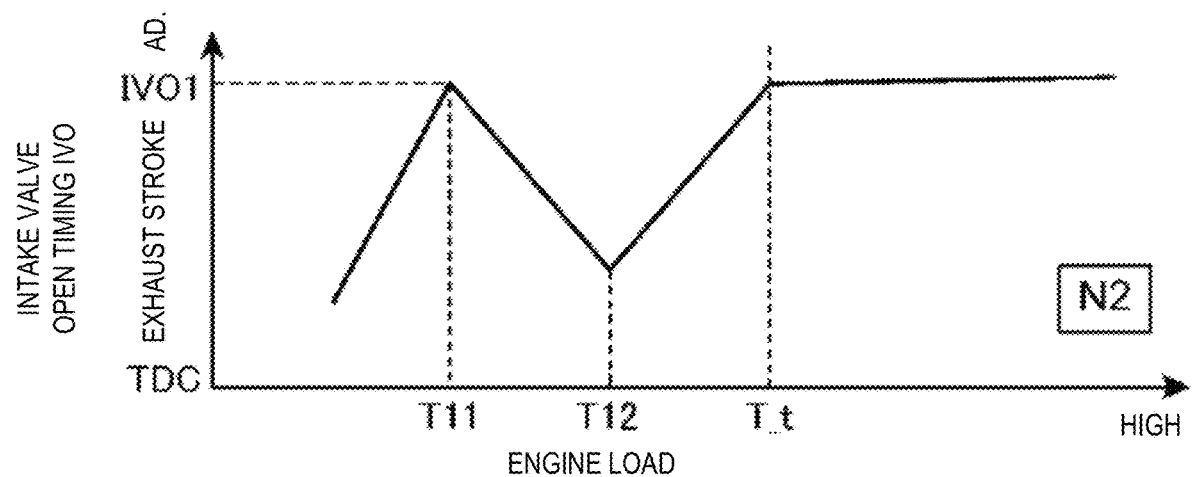
Figure 15C:
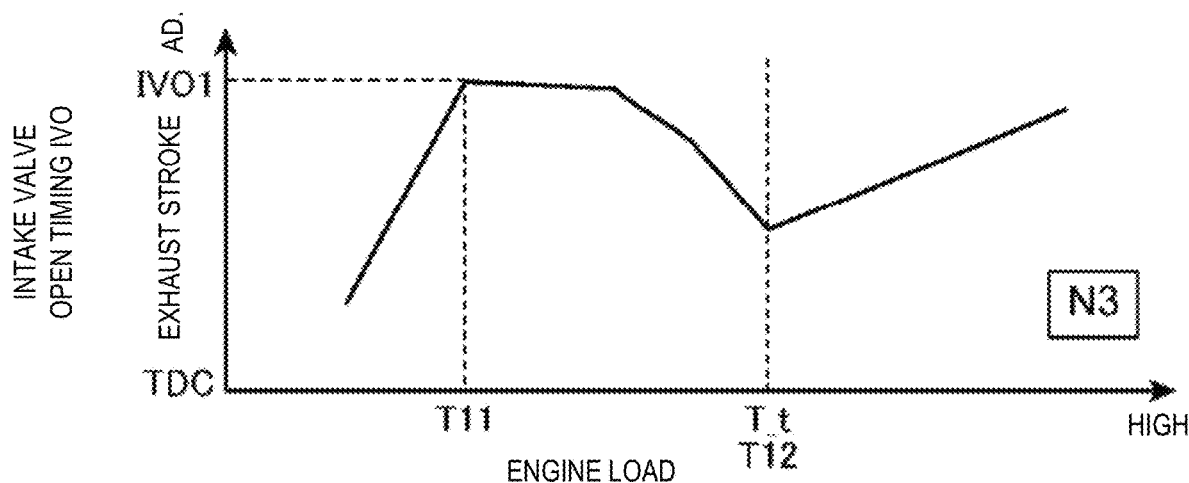
Figure 15D:
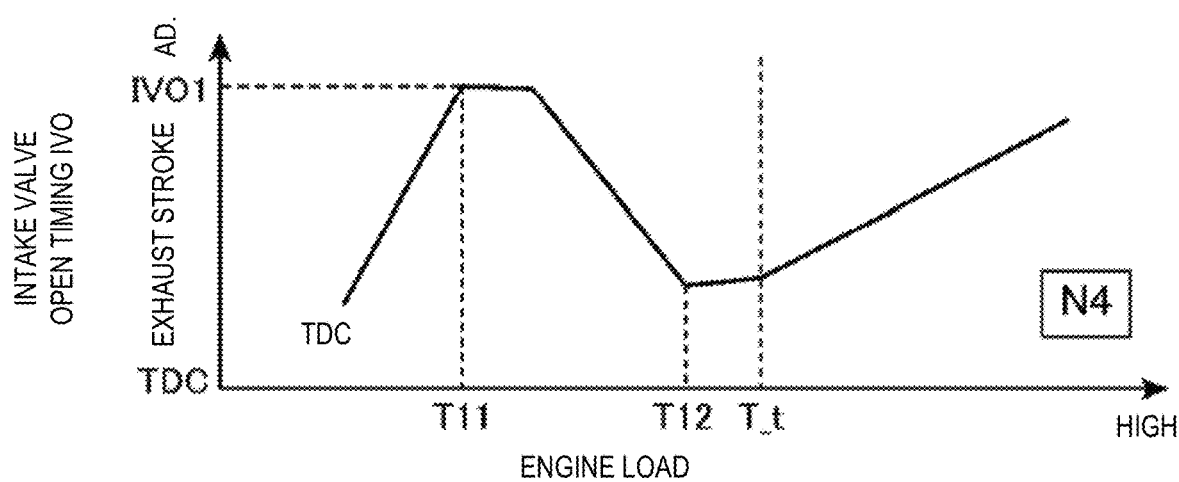

FIG. 14 is a chart of which a horizontal axis is the engine load and a vertical axis is the intake open timing IVO within the first partially warmed-up range B1, in which lines L11, L12, L13 and L14 indicate the intake open timings IVO when the engine speed is a first speed N1, a second speed N2, a third speed N3 and a fourth speed N4, respectively. FIGS. 15A to 15D illustrate the lines L11 to L14, respectively. First to fourth speeds N1 to N4 here correspond to the N1 to N4 illustrated in FIG. 13, and the engine speed increases in this order.

Note that as illustrated in FIG. 13, etc., within a low engine speed range, a highest load (a highest value of the engine load) of the first partially warmed-up range B1 is lower than the other ranges, and the line L11 at which the engine speed is the first speed N1 ends at a point at which the engine load is lower than the other lines L12, L13, and L14.

As illustrated in FIGS. 15A to 15D, the intake open timing IVO is set on the advancing side than the TDC of the exhaust stroke within the entire first partially warmed-up range B1.

As illustrated in FIGS. 15A to 15D, etc., within the entire first partial range B11 in which the engine load is below the first load T11 (at the respective engine speeds N1 to N4), the intake open timing IVO is set to advance as the engine load increases. In other words, within the first partial range B11, on the advancing side of TDC of the exhaust stroke, the intake open timing IVO is advanced as the engine load increases. In this embodiment, at each engine speed, the intake open timing IVO and the engine load have a substantially linear relationship, and the intake open timing IVO is advanced as the engine load increases.

Within the first partial range B11, at the highest engine load, i.e., the intake open timing IVO at the first load T11 is set to a first timing IVO1 which is near a most advanced timing thereof over all engine speeds. Within the first partial range B11, at each engine speed, the intake open timing IVO is changed between the first timing IVO1 and a timing retarded therefrom by 20° CA.

On the other hand, within the entire second partial range B12 in which the engine load is higher than the first load T11 and lower than the second load T12, the intake open timing IVO is set to be retarded as the engine load is higher (at all the engine speeds N1 to N4). In other words, within the second partial range B12, on the advancing side of TDC of the exhaust stroke, the intake open timing IVO is retarded as the engine load increases.

At a lowest engine load of the second partial range B12, that is, when the engine load is the first load T11, the intake open timing IVO is set to the first timing IVO1. Within the second partial range B12, the intake open timing IVO is retarded larger from the first timing IVO1 as the engine load increases from the first load T11. Accordingly, when the engine load changes across the first load T11, the intake open timing IVO continuously changes. In other words, in this embodiment, the intake open timing IVO within the first partial range B11 and the second partial range B12 is set so that the intake open timing IVO continuously changes when the engine load changes across the first load T11. Also within the second partial range B12, the intake open timing IVO is changed within a range of substantially 20° CA.

Within the second partial range B12, in an engine speed range from the first speed N1 to the second speed N2, i.e., a low engine speed range, the engine load and the intake open timing IVO have a substantially linear relationship, and the intake open timing IVO is retarded as the engine load increases. On the other hand, within the second partial range B12, in an engine speed range from the second speed N2 to the third speed N3, i.e., a high engine speed range, the change rate of the intake open timing IVO with respect to the engine load is lower as the engine load decreases, and when the engine load becomes high, the intake open timing IVO is changed relatively largely according to the engine load.

The intake open timing IVO in the third partial range B13 in which the engine load is higher than the second load T12 is set to be advanced as the engine load increases.

At each engine speed, the intake open timing IVO of when the engine load of the third partial range B13 takes a lowest value, that is, when the engine load is the second load T12 is set as same as that when the engine load of the second partial range B12 takes a highest value. Within the third partial range B13, the intake open timing IVO is advanced as the engine load increases from the second load T12. Accordingly, when the engine load changes across the second load T12, the intake open timing IVO continuously changes. In other words, in this embodiment, the intake open timing IVO within the second partial range B12 and the third partial range B13 is set so that the intake open timing IVO continuously changes when the engine load changes across the second load T12.

Within the third partial range B13, at the first and third speeds N1 and N3, the engine load and the intake open timing IVO have a substantially linear relationship, and the intake open timing IVO is advanced as the engine load increases.

On the other hand, in the third partial range B13, at the second speed N2, the change rate of the intake open timing IVO with respect to the engine load is set to be larger as the engine load decreases. More specifically, at the second speed N2, in a range where the engine load is higher than the boosting load T_t and the booster 33 performs the boost, the change rate of the intake open timing IVO with respect to the engine load is substantially 0, and in a range where the engine load is lower than the boosting load T_t and the booster 33 does not perform the boost, the intake open timing IVO is advanced as the engine load increases.

Moreover, within the third partial range B13, at the fourth speed N4, the change rate of the intake open timing IVO with respect to the engine load is set to be lower as the engine load decreases.

Figure 16:
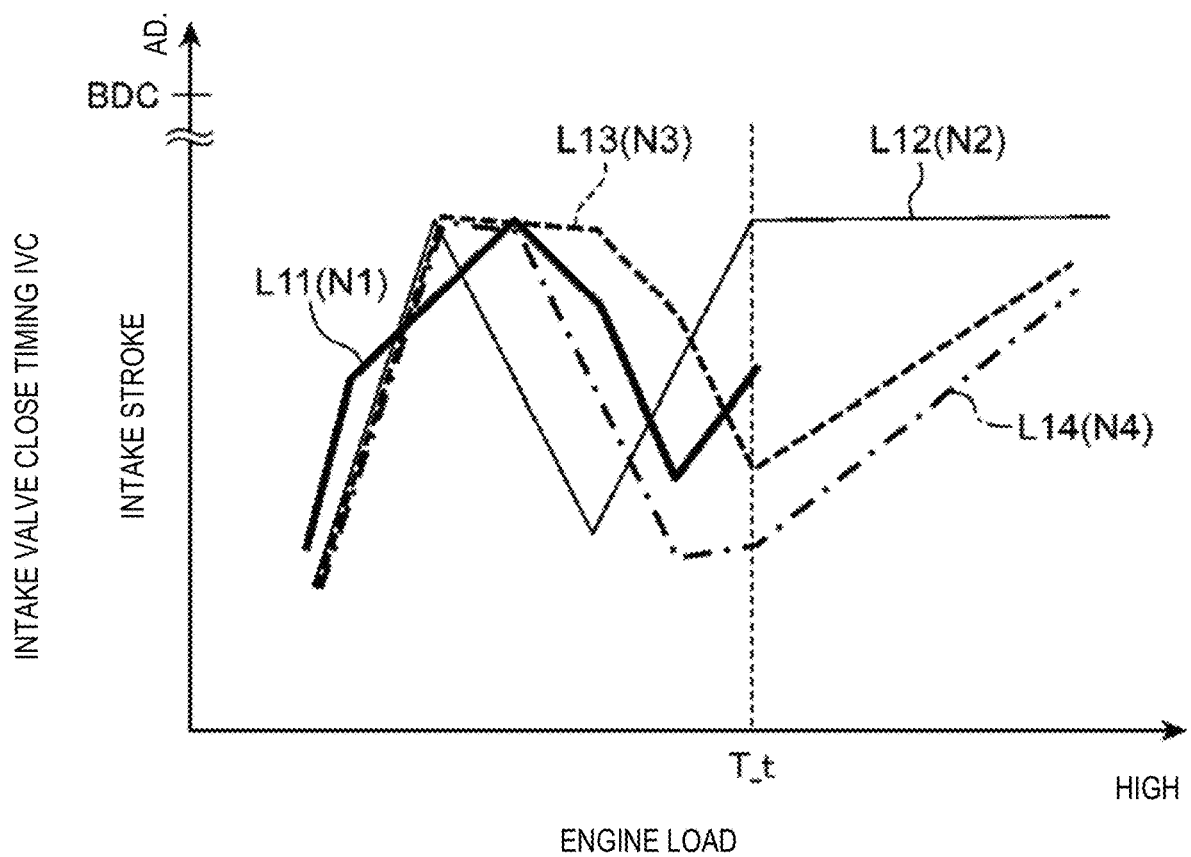
FIG. 16 is a chart illustrating a relationship between the engine load and the close timing of the intake valve set at respective engine speeds within the first partially warmed-up range.

FIG. 16 is a chart illustrating a relationship between the engine load and the intake close timing IVC at each of the engine speeds N1, N2, N3, and N4 of the first partially warmed-up range B1, corresponding to FIG. 14. As described above, the open and close timings of the intake valve 11 are changed while its open period is kept constant. Therefore, the intake close timing IVC is changed with respect to the engine load, etc. similarly to the intake open timing IVO.

As illustrated in FIG. 16, the intake close timing IVC is retarded than BDC of the intake stroke in the entire first partially warmed-up range B1, and the intake valve 11 is closed during the intake stroke. Accordingly, within the first partially-warmed-up range B1, the intake close timing IVC is advanced to increase the amount of air introduced into the combustion chamber 6. That is, when the intake valve 11 is opened during the intake stroke, air flows out from the combustion chamber 6 to the intake port 9 as the piston rises. Therefore, if the intake close timing IVC is advanced on the retarding side of BDC of the intake stroke, the amount of air flowing out to the intake port 9 is reduced and the amount of air confined in the combustion chamber 6 is increased.

(b) Close Timing of Exhaust Valve

Figure 17:
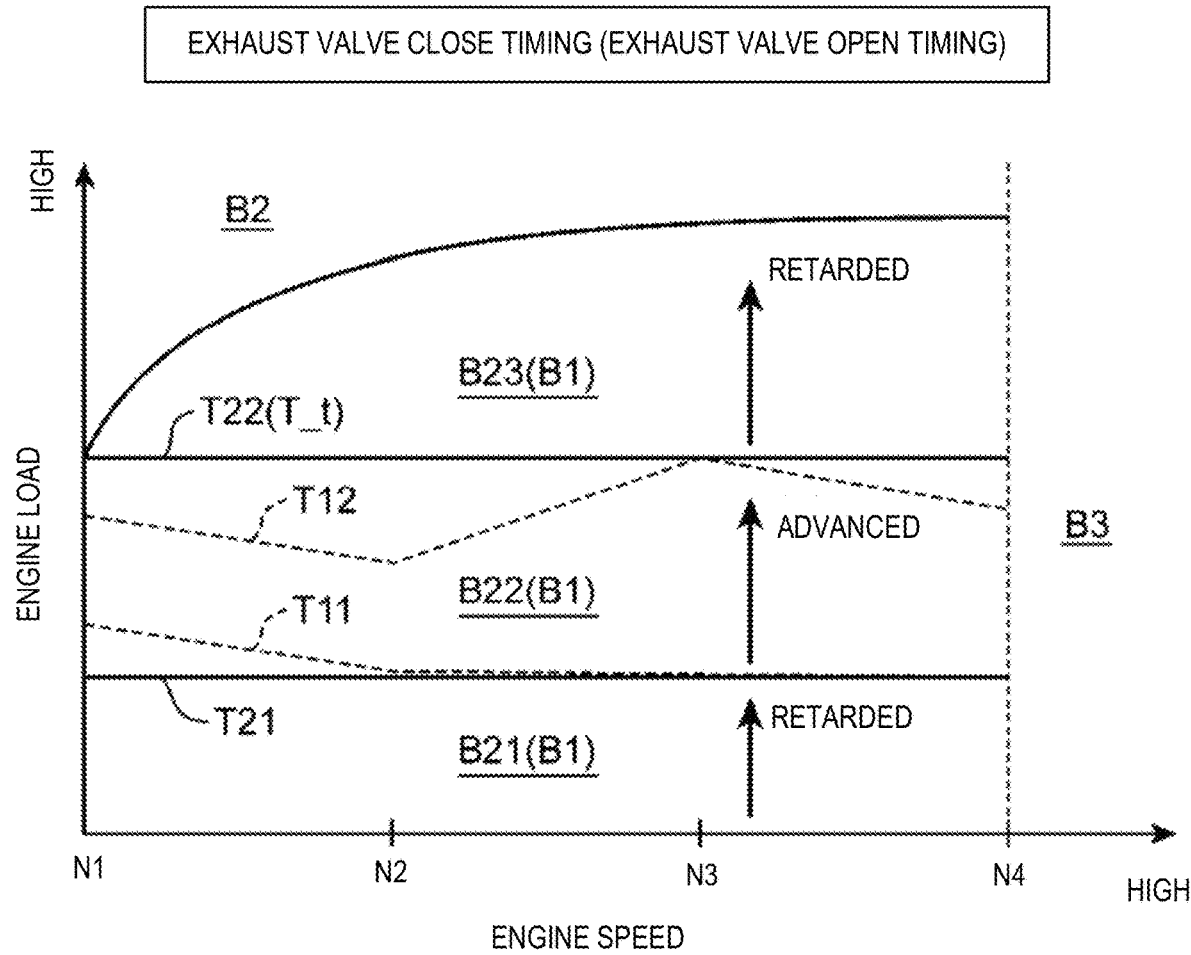
FIG. 17 is an operation map of the first partially warmed-up range divided into a plurality of sections based on the open and close timing of the exhaust valve.

FIG. 17 is an operation map of the first partially-warmed-up range B1 divided based on the open and close timings of the exhaust valve 12.

As illustrated in FIG. 17, the first partially warmed-up range B1 is mainly divided into three partial ranges B21 to B23 based on the open and close timings of the exhaust valve 12. When the three ranges are the fourth partial range B21, the fifth partial range B22, and the sixth partial range B23, the fourth partial range B21 is a low load range where the engine load is below a given third load T21, the sixth partial range B23 is a high load range where the engine load is higher than a given fourth load T22, and the fifth partial range B22 is a medium load range which covers the rest of engine loads.

Here, the fourth load T22 corresponds to a "second reference load", the fifth partial range B22 corresponds to a "third operating range", and the sixth partial range B23 corresponds to "fourth operating range." Note that as described later, the fourth load T22 is a boundary between a load range where the close timing EVC of the exhaust valve 12 is advanced as the engine load increases and a load range where the exhaust close timing EVC is retarded as the engine load increases.

The first load T11 and the third load T21 are set to be substantially the same value at the respective engine speeds and the first partial range B11 and the fourth partial range B21 are set in substantially the same range. For example, as illustrated in FIG. 17, the first load T11 and the third load T21 are set to the same value when the engine speed is high. On the other hand, the first load T11 is set slightly higher than the third load T21 when the engine speed is low. Note that this difference between the loads T11 and T21 is sufficiently small with respect to the full load (highest load) of the engine (e.g., less than 10% of the full load).

Moreover, the second load T12 and the fourth load T22 are set as the same value in the engine speed range near the third speed N13. Although the second load T12 and the third load T22 differ in other engine speed ranges, the difference is sufficiently small.

Figure 18:
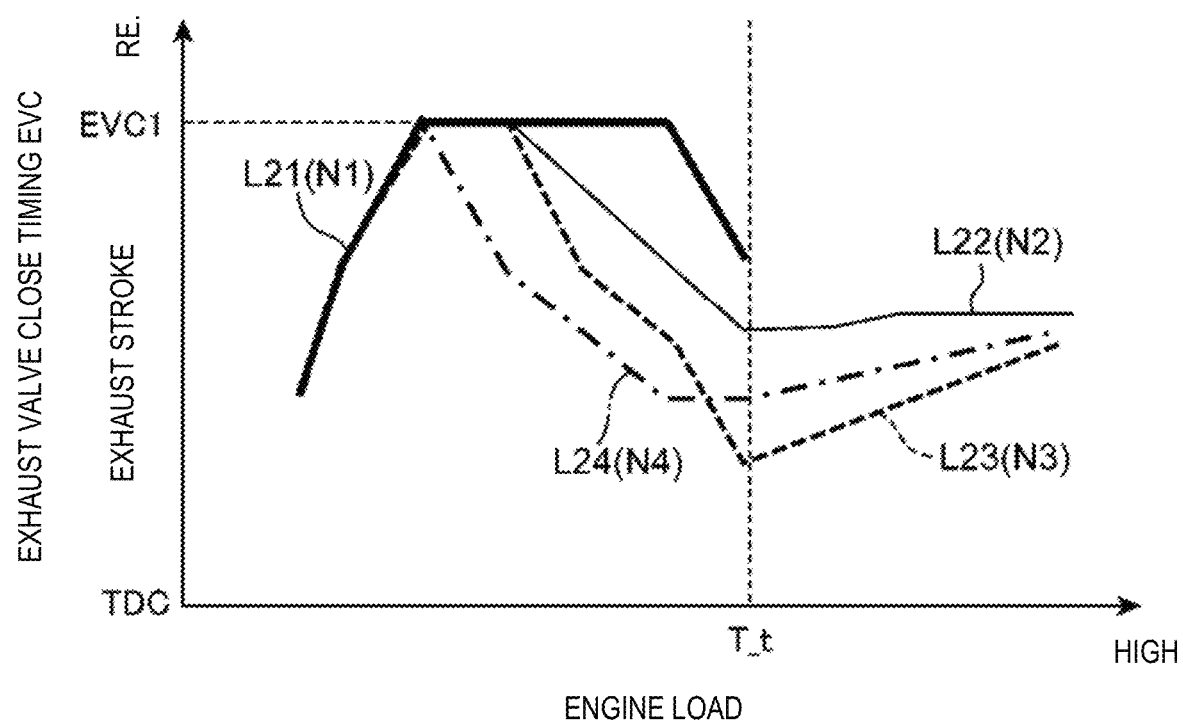
FIG. 18 is a chart illustrating a relationship between the engine load and the close timing of the exhaust valve set at respective engine speeds within the first partially warmed-up range.
Figure 19A:
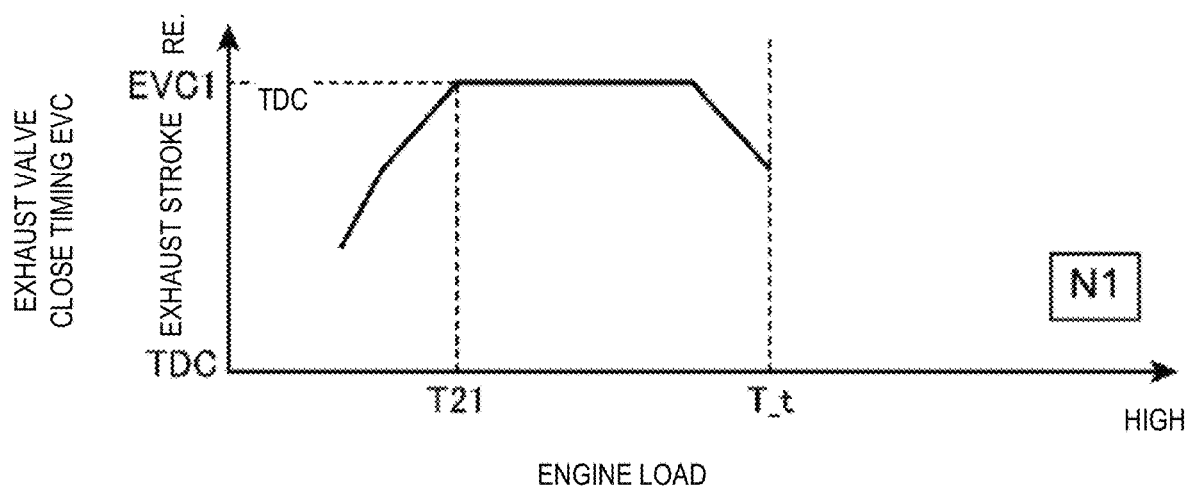
Figure 19B:
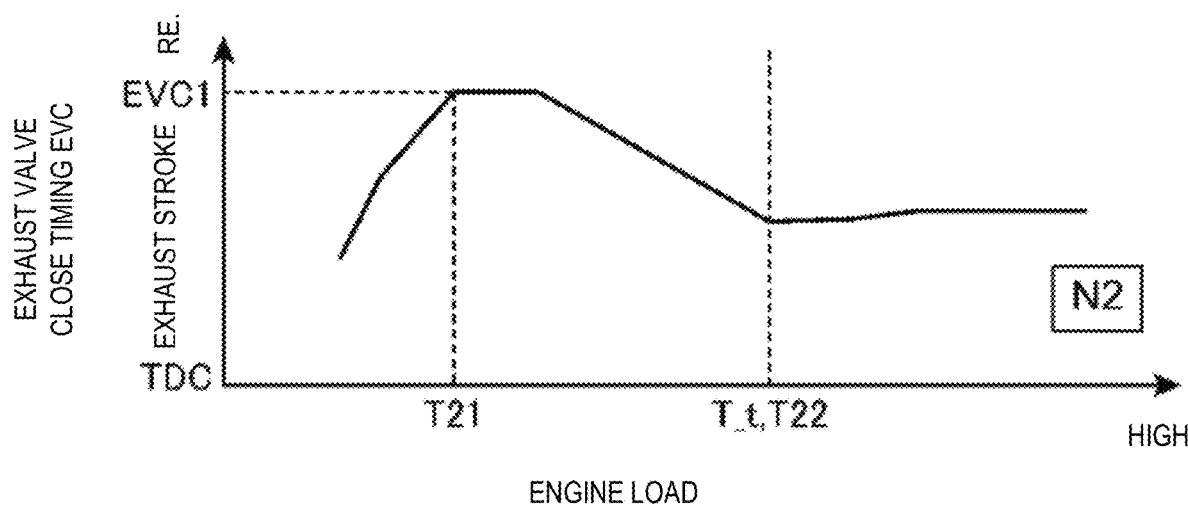
Figure 19C:
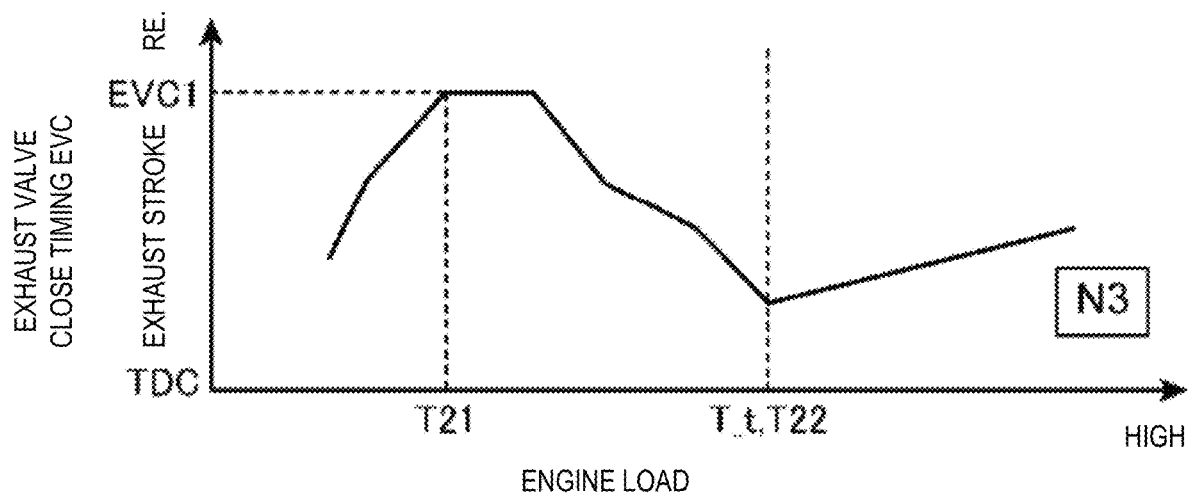
Figure 19D:
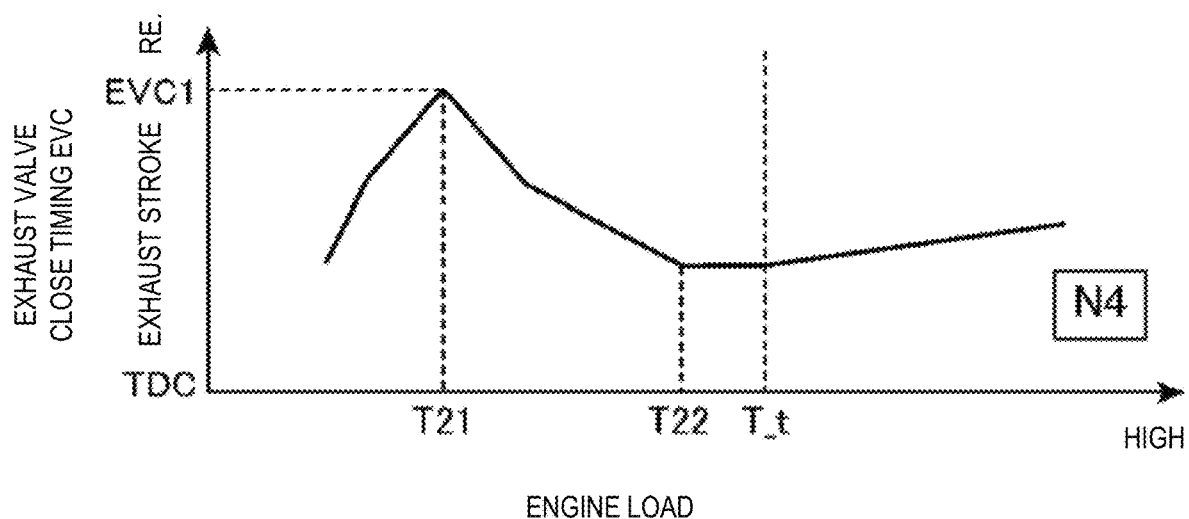

FIG. 18 is a chart of which a horizontal axis is the engine load and a vertical axis is the exhaust close timing EVC, in which lines L21, L22, L23, and L24 indicate the exhaust close timing EVC when the engine speed is the first speed N1, the second speed N2, the third speed N3 and the fourth speed N4, respectively. FIGS. 19A to 19D illustrate the lines L21 to L24, respectively.

As illustrated in FIG. 18 etc., the exhaust close timing EVC is set on the retarding side of TDC of the exhaust stroke in the entire range of the first partially warmed-up range B1. That is, within the first partially warmed-up range B1, the exhaust valve 12 is closed at or after TDC of the exhaust stroke.

As illustrated in FIGS. 19A to 19D, etc., within the fourth partial range B21 in which the engine load is lower than the third load T21, the exhaust close timing EVC is set to retard as the engine load increases. In other words, within the fourth partial range B21, on the retarding side of TDC of the exhaust stroke, the exhaust close timing EVC is retarded as the engine load increases. In this embodiment, at each engine speed, the exhaust close timing EVC and the engine load have a substantially linear relationship, and the exhaust close timing EVC is advanced as the engine load increases. At a highest engine load of the fourth partial range B21, that is, when the engine load is the third load T21, the exhaust close timing EVC is set to a third timing EVC1 for every engine speed. Within the fourth partial range B21, at each engine speed, the exhaust close timing EVC is changed between the third timing EVC1 and a timing advanced therefrom by about 20° CA.

On the other hand, the exhaust close timing EVC in the fifth partial range B22 in which the engine load is higher than the third load T21 and lower than the fourth load T22 is set to advance as the engine load increases. In other words, within the fifth partial range B22, on the retarding side of TDC of the exhaust stroke, the exhaust close timing EVC is advanced as the engine load increases.

At a lowest engine load of the fifth partial range B22, that is, when the engine load is the third load T21, the exhaust close timing EVC is set to the third timing EVC1. Accordingly, when the engine load changes across the third load T21, the exhaust close timing EVC continuously changes. In other words, in this embodiment, the exhaust close timing EVC within the fourth partial range B21 and the fifth partial range B22 is set so that the exhaust close timing EVC continuously changes when the engine load changes across the third load T21. Also within the fifth partial range B22, the exhaust close timing EVC is changed within a range of substantially 20° CA.

At a high engine speed side (fourth speed N4) of the fifth partial range B22, the exhaust close timing EVC and the engine load have a substantially linear relationship and the exhaust close timing EVC is advanced as the engine load increases. On the other hand, at a low engine speed side (first to third speeds N1 to N3) of the fifth partial range B22, the exhaust close timing EVC and the engine load are kept substantially constant regardless of the engine load in a low engine load range, and is advanced as the engine load increases in a high engine load range.

The exhaust close timing EVC in the sixth partial range B23 in which the engine load is higher than the fourth load T22 is set to retard as the engine load increases. In other words, within the sixth partial range B23, on the retarding side of TDC of the exhaust stroke, the exhaust close timing EVC is retarded as the engine load increases.

At each engine speed, when the engine load of the sixth partial range B23 takes a lowest value, that is, the exhaust close timing EVC when the engine load is the fourth load T22 is set as same as that when the engine load of the fifth partial range B22 takes a highest value. Accordingly, when the engine load changes across the fourth load T22, the exhaust close timing EVC continuously changes. In other words, in this embodiment, the exhaust close timing EVC within the fifth partial range B22 and the sixth partial range B23 is set so that the exhaust close timing EVC continuously changes when the engine load changes across the fourth load T22.

Note that as described above, the open and close timings of the exhaust valve 12 are changed while its open period is kept constant. Therefore, the open timing EVO of the exhaust valve 12 is changed with respect to the engine load, etc. similarly to the exhaust close timing EVC.

(c) Valve Overlap Period

Figure 20:
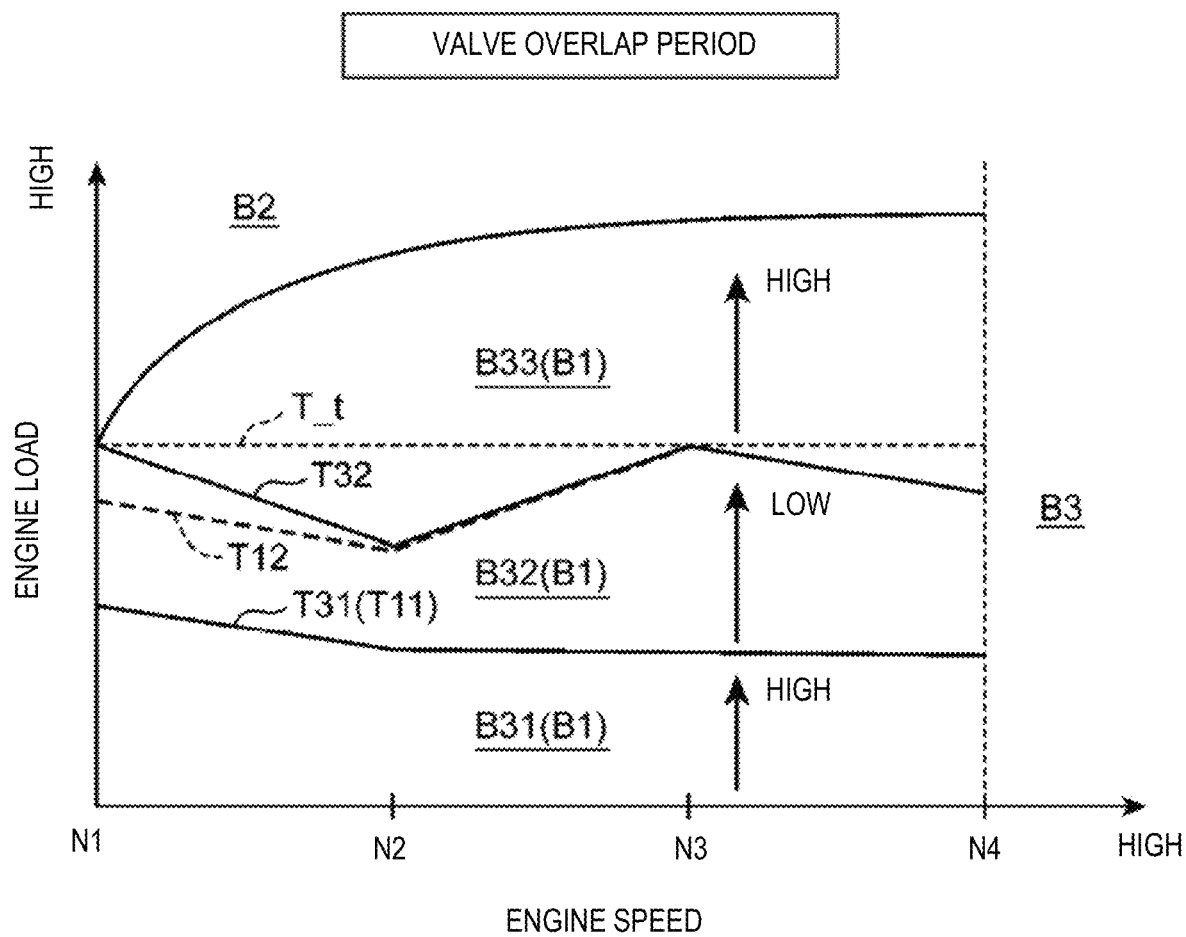
FIG. 20 is an operation map within the first partially warmed-up range divided into a plurality of sections based on a valve overlap period.
Figure 21:
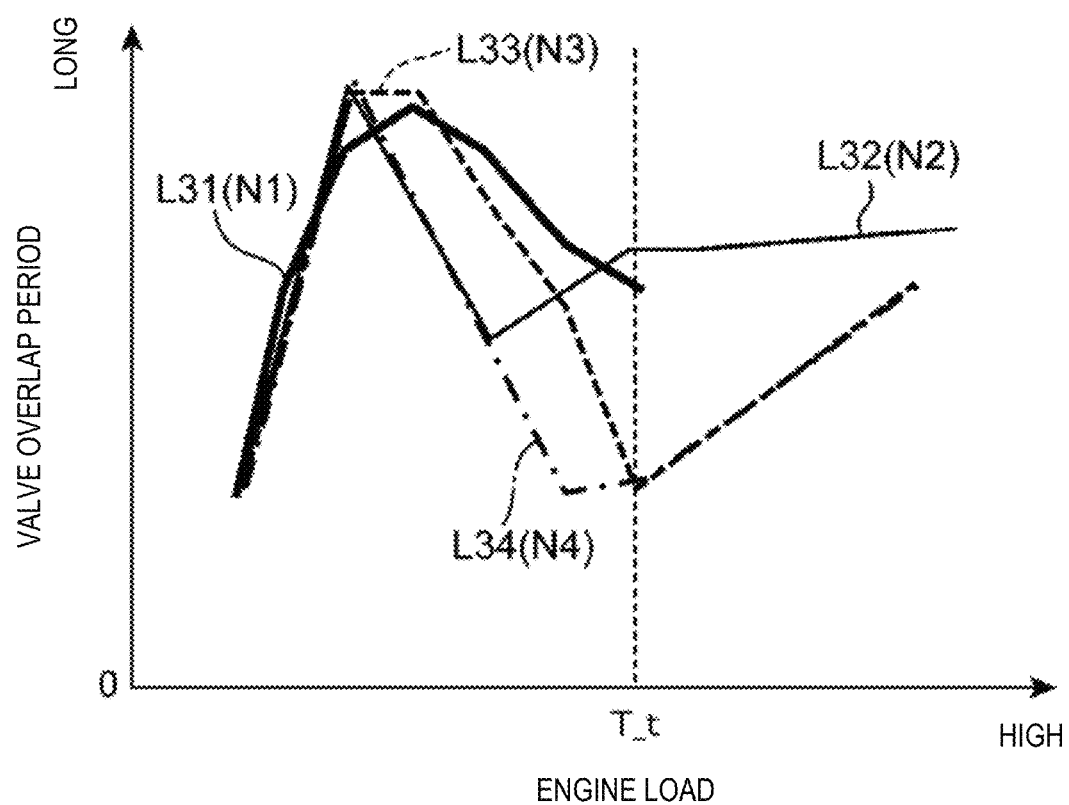
FIG. 21 is a chart illustrating a relationship between the engine load and the valve overlap period set at respective engine speeds within the first partially warmed-up range.

As the open and close timings of the intake valve 11 and the exhaust valve 12 are set as described above, within the first partially warmed-up range B1, both the intake valve 11 and the exhaust valve 12 open across TDC of the exhaust stroke. Further, the first partially warmed-up range B1 is divided as illustrated in FIG. 20 based on a valve overlap period in which both of the intake valve 11 and the exhaust valve 12 are opened across TDC of the exhaust stroke (hereinafter, suitably referred to as a valve overlap period). Moreover, the relationship between the valve overlap period and the engine load at each of the engine speeds N1 to N4 (indicated by lines L31 to L34, respectively) is as illustrated in FIG. 21.

The first partially warmed-up range B1 is mainly divided into three partial ranges B31 to B33 based on the valve overlap period. When the three ranges are the O/L low load range B31, the O/L medium load range B32, and the O/L high load range B33, the O/L low load range B31 is a low engine load range lower than a first O/L reference load T31, the O/L high load range B33 is a high load range higher than a second O/L reference load T32, and the O/L medium load range B32 is the remaining medium load range.

The first O/L reference load T31 matches with the first load T11, and the O/L low load range B31 matches with the first partial range B11. Further, the O/L low load range B31 substantially matches with the fourth partial range B21. The second O/L reference load T32 substantially matches with the second load T12, the O/L medium load range B32 substantially matches with the second partial range B12, and the O/L high load range B33 substantially matches with the third partial range B13.

Figure 25:
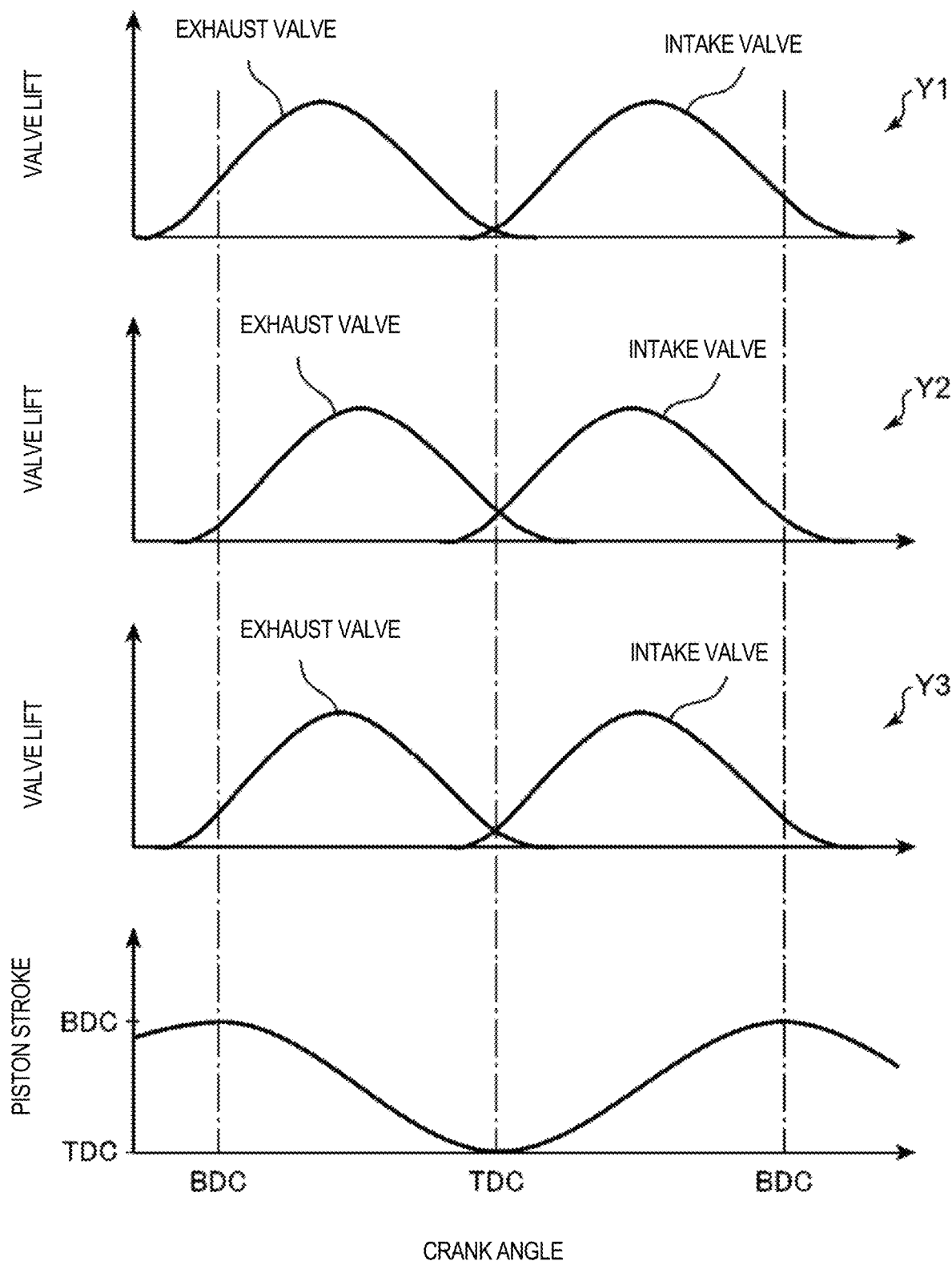
FIG. 25 shows charts illustrating changes of the valve overlap period according to an increase of the engine load.

FIG. 25 shows schematic charts illustrating valve lifts of the intake valve 11 and the exhaust valve 12 at each operation point when the engine speed is the second speed N2. The chart indicated by Y1 in FIG. 25 is for an operation point Y1 included within the O/L low load range B31, the first partial range B11 and the fourth partial range B21, and the chart indicated by Y2 in FIG. 25 is for an operation point Y2 included within the O/L medium load range B32, the second partial range B12 and the fifth partial range B22, and the chart indicated by Y3 in FIG. 25 is for an operation point Y3 included within the O/L high load range B33, the third partial range B13 and the sixth partial range B23. Note that the lowest chart of FIG. 25 illustrates a change in the piston stroke (the position of the piston) with respect to the crank angle.

Within the entire (at all engine speeds of) O/L low load range B31 (the first partial range B11 and the fourth partial range B21), the valve overlap period becomes longer as the engine load increases. In this embodiment, at each engine speed, the valve overlap period and the engine load have a substantially linear relationship, and the valve overlap period becomes longer as the engine load increases.

On the other hand, within the entire (at all engine speeds of) O/L medium load range B32 (the second partial range B12), the valve overlap period becomes longer than as the engine load increases. More specifically, at the third speed N3, the valve overlap period is kept constant regardless of the engine load on the low load side, and the valve overlap period is shortened as the engine load increases on the high load side. At other engine speeds N1, N2, and N4, the valve overlap period becomes shorter as the engine load increases within the entire O/L medium load range B32.

The overlap period when the engine load takes a lowest value within the O/L medium load range B32 is set to the same value as the overlap period when the engine load takes a highest value within the O/L low load range B31, that is, when the engine load is the first O/L reference load T31 (first load T11).

Within the entire O/L high load range B33 (at all engine speeds), the valve overlap period becomes longer than as the engine load increases. In this embodiment, the valve overlap period becomes longer as the engine load increases at each engine speed.

The overlap period when the engine load takes a lowest value within the O/L high load range B33 is set to the same value as the overlap period when the engine load takes a highest value within the O/L medium load range B32, that is, when the engine load is the second O/L reference load T32.

(5) Setting of External EGR Ratio Within First Partially Warmed-Up Range B1

Figure 22:
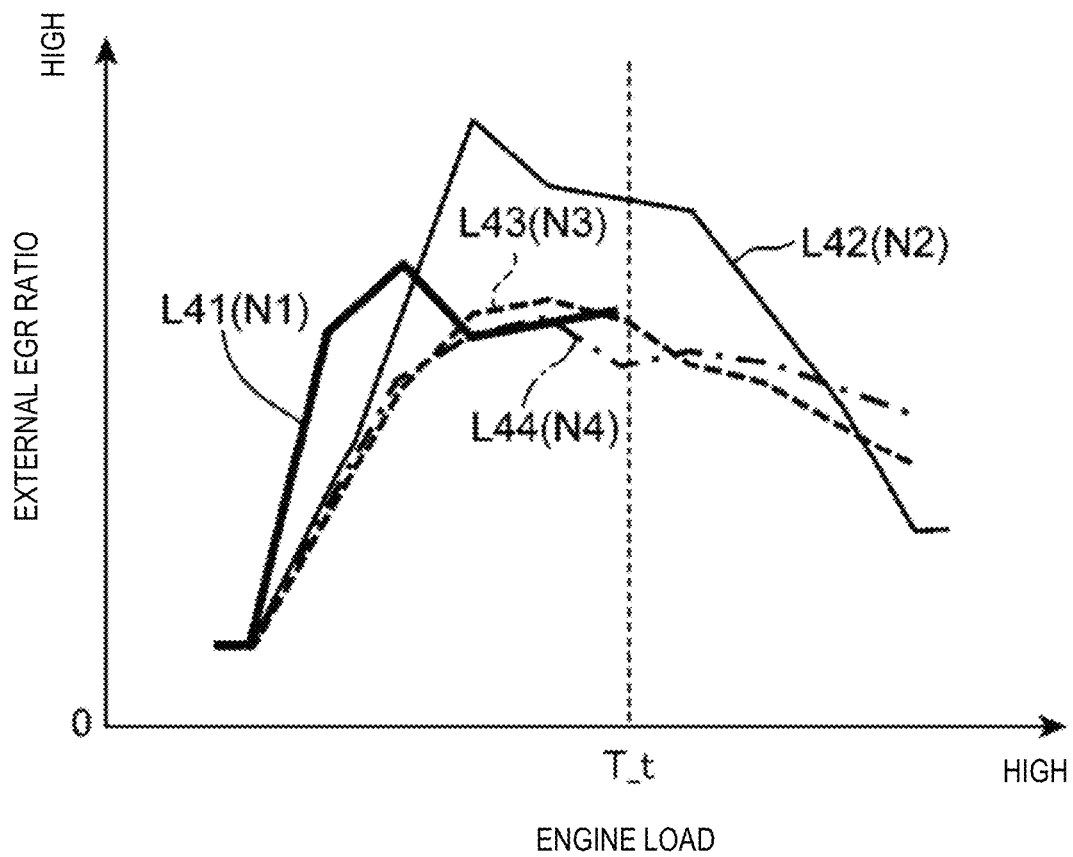
FIG. 22 is a chart illustrating a relationship between the engine load and an external EGR ratio set at respective engine speeds within the first partially warmed-up range.
Figure 23A:
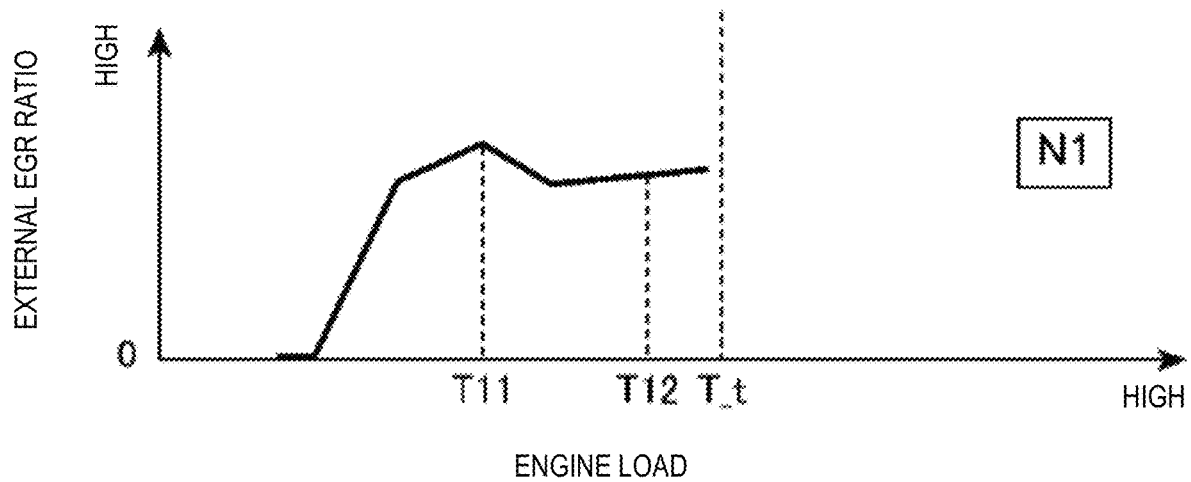
Figure 23B:
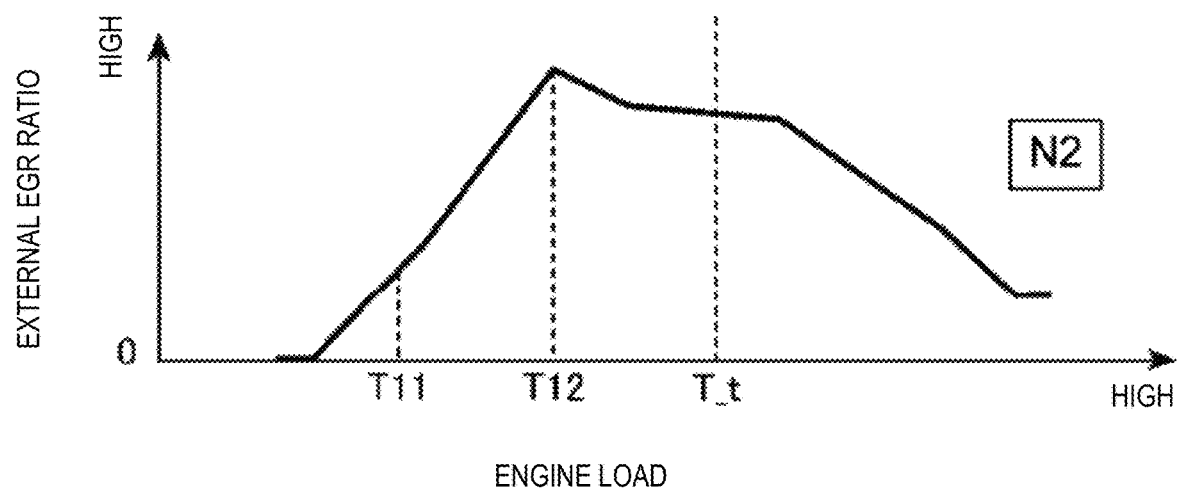
Figure 23C:
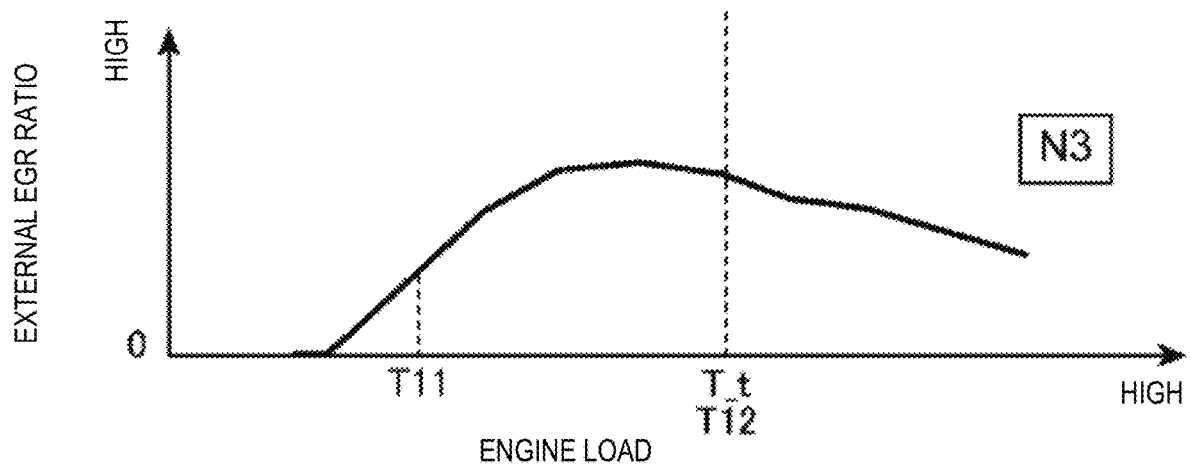
Figure 23D:
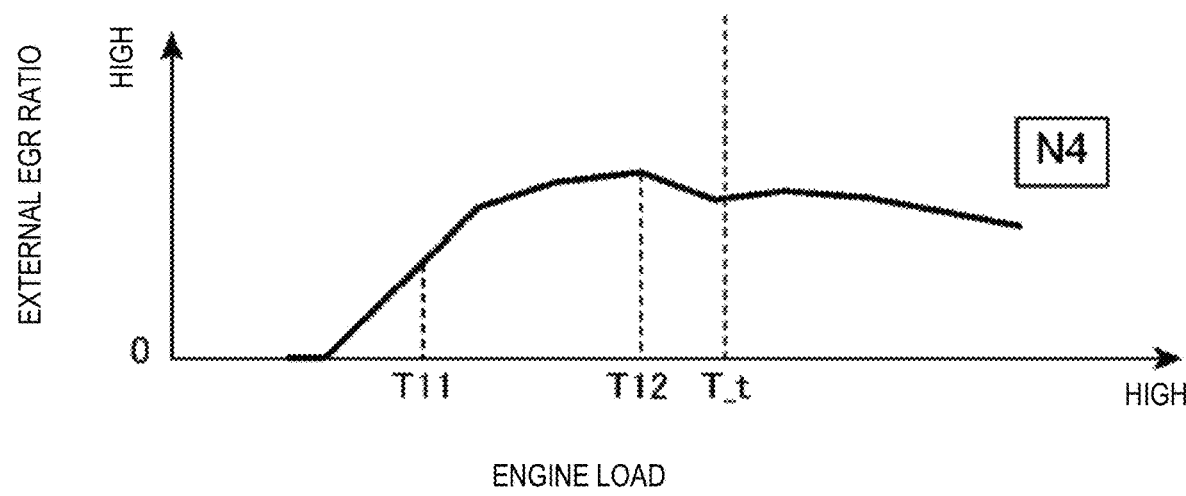

FIG. 22 is a chart of which a horizontal axis is the engine load and a vertical axis is the target external EGR ratio within the first partially warmed-up range B1, in which lines L41, L42, L43, and L44 indicate the target external EGR ratios when the engine speed is the first speed N1, the second speed N2, the third speed N3 and the fourth speed N4, respectively. FIGS. 23A to 23D illustrate the lines L41 to L44, respectively.

As illustrated in FIGS. 22 and 23, the first partially warmed-up range B1 includes a segment in which the engine load is below the boosting load T_t, and substantially covers all the first partial range B11, the second partial range B12 and the fourth partial range B21. The target external EGR ratio is substantially set higher as the engine load increases. Further, within a range where the engine load is higher than the boosting load T_t, the target external EGR ratio is set smaller as the engine load increases.

Specifically, when the engine load is below the first load T11, that is, within the first partial range B11, at all engine speeds N1 to N4, the target external EGR ratio is increased as the engine load increases.

Within the range where the engine load is higher than the first load T11 and lower than the second load T12, that is, within the second partial range B12, the target external EGR ratio is set for each engine speed as follows.

At the first speed N1 of the second partial range B12, the target external EGR ratio is maintained substantially constant regardless of the engine speed. At the first speed N1, the target external EGR ratio at the lowest engine load of the second partial range B12 and the target external EGR ratio at the highest engine load of the first partial range B11 are set to the same value, and within the second partial range B12, the target external EGR ratio is maintained relatively high.

At the third speed N3 of the second partial range B12, the target external EGR ratio is increased as the engine load increases in the low engine load range, and is decreased as the engine load increases in the high engine load range. Note that the reduction amount of the target external EGR ratio according to the engine load increase is extremely small, and at the third speed N3 of the second partial range B12, the target external EGR ratio is substantially large when the engine load increases.

At the second speed N2 and the fourth speed N4 of the second partial range B12, the target external EGR ratio increases as the engine speed increases.

(6) About SI Ratio

As described above, in this embodiment SPCCI combustion combining SI combustion and CI combustion is performed within the first partially warmed-up range B1, etc. In this SPCCI combustion, it is important to control the ratio of SI combustion to CI combustion according to the operating condition.

In this embodiment, a SI ratio which is a ratio of a heat amount generated by SI combustion with respect to a total heat amount generated by SPCCI combustion (SI combustion and CI combustion) is used. FIG. 7 is a chart illustrating this SI ratio and illustrating a change in heat generation rate (J/deg) according to the crank angle when SPCCI combustion occurs. A point X1 in the waveform of FIG. 7 is a heat generation point at which the heat generation rate rises with the start of SI combustion, and a crank angle $\theta si$ corresponding to this heat generation point X1 is defined as the start timing of SI combustion. The point X2 in the same waveform is a flection point appearing when the combustion mode switches from SI combustion to CI combustion and the crank angle $\theta ci$ corresponding to this flection point X2 may be defined as the start timing of CI combustion. Further, an area R1 of the waveform of the heat generation rate located on the advancing side of $\theta ci$ which is the start timing of CI combustion (from $\theta si$ to $\theta ci$) is set as the heat generation amount by SI combustion, and an area R2 of the waveform of the heat generation rate located on the retarding side of $\theta ci$ is set as a heat generation rate by CI combustion. Thus, the SI ratio defined by (heat generation amount by SI combustion)/(heat generation amount by SPCCI combustion) may be expressed by R1/(R1+R2) using the respective areas R1 and R2. That is, in this embodiment, the SI ratio=R1/(R1+R2).

In CI combustion, since the mixture gas combusts a plurality of times simultaneously by self-ignition, the pressure rise rate easily increases compared to SI combustion which is caused by flame propagation. Therefore, especially if the SI ratio is carelessly decreased (that is, a proportion of CI combustion is increased) under a condition of high load and high fuel injection amount, loud noise is generated. On the other hand, since CI combustion does not occur unless the combustion chamber 6 is sufficiently heated and pressurized, under the condition that the load is low and the fuel injection amount is small, CI combustion is not started unless SI combustion has progressed to some extent, and the SI ratio naturally increases (that is, the proportion of CI combustion increases). In consideration of such circumstances, in this embodiment, the target SI ratio, which is the target value of SI ratio, is determined for each operating condition of the engine in the operation range where SPCCI combustion is performed. For example, within the first partially warmed-up range B1, the target SI ratio is set to decrease as the load substantially increases (that is, the proportion of CI combustion increases). Further correspondingly, in this embodiment, the target $\theta ci$, which is the start timing of CI combustion when combustion conforming to the target SI ratio is performed, is determined for each operating condition of the engine.

In order to achieve the target SI ratio and the target $\theta ci$ described above, control amounts such as the timing of the main ignition by the spark plug 16, the injection amount/injection timing of fuel from the injector 15, the EGR ratio (the external EGR ratio and the internal EGR ratio) are adjusted for each operating condition. For example, as the ignition timing is advanced, a larger amount of fuel is combusted in SI combustion, and the SI ratio increases. Further, as the injection timing of the fuel is advanced, a larger amount of fuel is combusted in CI combustion, and the SI ratio decreases. Moreover, since a change in SI ratio is followed by a change in $\theta ci$, changes in these control amounts (the main ignition timing, the injection timing, etc.) are elements for adjusting $\theta ci$.

Based on the above tendency, in this embodiment, during the execution of SPCCI combustion, the main ignition timing, the fuel injection amount/injection timing, etc. are controlled in combination with each other to achieve the target SI ratio and target $\theta ci$ described above.

(7) Operations and Effects

In this embodiment, since the open and close timings of the intake valve 11, the open and close timings of the exhaust valve 12, and the target external EGR ratio are set as described above within the first partially warmed-up range B1, the internal EGR gas, the external EGR gas, and air are suitably remained inside the combustion chamber 6 and the suitable SPCCI combustion is achieved to improve fuel efficiency.

Further, in this embodiment, since the air-fuel ratio of the mixture gas is near the stoichiometric air-fuel ratio, an exhaust gas performance is improved by using the three-way catalyst. The air-fuel ratio of the mixture gas being near the stoichiometric air-fuel ratio as described above makes a larger amount of burnt gas be introduced into the combustion chamber 6 compared to a case where the air-fuel ratio is higher than the stoichiometric air-fuel ratio (lean). The pressure rise at the time of the combustion is suppressed with the large amount of burnt gas so that the increase of the combustion noise is avoided. This avoidance of the increase in combustion noise enables to perform SPCCI combustion at the high load side (the highest load).

For example, when the engine load is extremely low, since the temperature inside the combustion chamber 6 is difficult to rise, the combustion tends to be unstable.

In this regard, in this embodiment, within the first partial range B11 (fourth partial range B21), the intake open timing IVO is advanced on the advancing side of TDC of the exhaust stroke as the engine load increases. Therefore, within the low engine load side of the first partial range B11, by shortening the open period of the intake valve 11 on the intake stroke, the amount of burnt gas (internal EGR gas) discharged from the combustion chamber 6 to the intake port 9A and flowing back into the combustion chamber 6 again is reduced, and the reaction of air and fuel is prevented from being interrupted by the burnt gas, which improves combustion stability. Within the high engine load side of the first partial range B11, by increasing the open period of the exhaust valve 12 on the exhaust stroke, the larger amount of burnt gas (internal EGR gas) which is high temperature due to the high engine load can be remained in the combustion chamber 6, and the temperature of the combustion chamber 6 is increased, which improves combustion stability.

On the other hand, when the engine load increases to some extent, the temperature inside the combustion chamber 6 may excessively increase and the start of CI combustion may be further advanced than a desired timing. If the start timing of CI combustion becomes excessively early, the combustion noise increases. The ignition timing needs to be retarded so that SI combustion occurs after TDC of the compression stroke if combustion noise increases. However, retarding the ignition timing causes CI combustion at a timing when the piston descends significantly on the expansion stroke, decreasing fuel efficiency.

In this regard, in this embodiment, within the second partial range B12 that is the higher engine load side than the first partial range B11 (fourth partial range B21), the intake open timing IVO is retarded on the advancing side of TDC of the exhaust stroke as the engine load increases. Therefore, within the high engine load side of the second partial range B12 where the temperature inside the combustion chamber 6 easily rises, by shortening the open period of the intake valve 11 on the exhaust stroke, the amount of high-temperature burnt gas (internal EGR gas) remaining in the combustion chamber 6 is reduced, and the temperature inside the combustion chamber 6 is prevented from being excessively high. Therefore, there is no need to greatly retard the ignition timing to suppress the increase of combustion noise, which reliably improves fuel efficiency. Within the low engine load side of the second partial range B12, by increasing the amount of high-temperature burnt gas (internal EGR gas) remaining in the combustion chamber 6, combustion stability is improved.

Further, in this embodiment, as illustrated in FIG. 17, etc. within the fifth partial range B22 including the second partial range B12, the exhaust valve 12 is controlled so that the exhaust close timing EVC is advanced on the retarding side of TDC of the exhaust stroke as the engine load increases. That is, within the fifth partial range B22 including the second partial range B12, the open period of the exhaust valve 12 on the intake stroke reduces as the engine load increases. Thus, on the high load side of the fifth partial range B22 including the second partial range B12, the amount of high-temperature burnt gas (internal EGR gas) discharged from the combustion chamber 6 to the exhaust port 10 and flowing back into the combustion chamber 6 again is reduced, and the amount of high-temperature burnt gas remaining inside the combustion chamber 6 (i.e., the amount of high-temperature internal EGR gas) is reliably reduced. This surely prevents the temperature inside the combustion chamber 6 from being excessively high. Further, on the low load side of the fifth partial range B22 including the second partial range B12, the amount of high-temperature burnt gas remaining inside the combustion chamber 6 (i.e., the amount of high-temperature internal EGR gas) is increased, which reliably improves the combustion stability.

Here, in a state where the boost is performed by the booster 33, by retarding the exhaust close timing EVC in the range on the retarding side of TDC of the exhaust stroke (the range where the intake valve 11 and the exhaust valve 12 are open for a given period of time across TDC of the exhaust stroke), the scavenging inside the combustion chamber 6 is promoted and the internal EGR gas is reduced. In this regard, in this embodiment, the boost by the booster 33 is not performed within the fifth partial range B22 including the second partial range B12. Thus, as described above, on the low load side of the fifth partial range B22 and the second partial range B12, the amount of internal EGR gas remaining inside the combustion chamber 6 is increased to improve the combustion stability, and on the high load side of the fifth partial range B22 and the second partial range B12, the amount of internal EGR gas remaining inside the combustion chamber 6 is reliably reduced to prevent the temperature inside the combustion chamber 6 from being excessively high.

Further, in this embodiment, within the third partial range B13 where the engine load is further higher, the intake close timing IVC is advanced as the engine load increases on the retarding side of the BDC of the intake stroke. Here, when advancing the intake close timing IVC as described above, the air amount flowing back to the intake port 9 is reduced and the air amount confined in the combustion chamber 6 can be increased. Therefore, within the third partial range B13, the air amount inside the combustion chamber 6 can be increased according to the increase of the engine load, and the suitable air amount in the combustion chamber 6 corresponding to the engine load, that is, the fuel amount, can be secured. As a result, the air-fuel ratio inside the combustion camber 6 can be brought to near the stoichiometric air-fuel ratio more reliably.

Furthermore, in this embodiment, as illustrated in FIG. 20, etc. within the third partial range B13, the boost by the booster 33 is performed in the state where the valve overlap period is longer than 0 (the state where both of the intake valve 11 and the exhaust valve 12 are open across TDC of the exhaust stroke). Thus, within the third partial range B13, the scavenging inside the combustion chamber 6 is performed so that the high-temperature internal EGR gas remaining inside the combustion chamber 6 can be reduced, which prevents the temperature inside the combustion chamber 6 from being excessively high. Especially, in this embodiment, as illustrated in FIG. 17, within the sixth partial range B23 including the high load side of the third partial range B13, the exhaust close timing EVC is retarded on the retarding side of TDC of the exhaust stroke as the engine load increases. Accordingly, as illustrated in FIG. 20, within substantially entire third partial range B13, the valve overlap period increases as the engine load increases. Thus, on the high load side of the third partial range B13 and within the range where the temperature inside the combustion chamber 6 especially easily rises, scavenging capacity of the cylinder 2 is improved and the internal EGR gas is reduced.

Further, in this embodiment, within the range where the engine load including the second partial range B12 is lower than the boosting load T_t, the external EGR ratio is substantially increased as the engine load increases. Therefore, within the second partial range B12, the amount of the high-temperature internal EGR gas remaining inside the combustion chamber 6 when the engine load is high is reduced, while the external EGR gas introduced into the combustion chamber 6 is increased. Since the external EGR gas is introduced into the combustion chamber 6 after passing through the EGR passage 51, the temperature of the external EGR gas at the point of it being introduced into the combustion chamber 6 is lower than the internal EGR gas remaining inside the combustion chamber 6. Especially in this embodiment, the external EGR gas is introduced into the combustion chamber 6 after being cooled by the EGR cooler 52. Therefore, the temperature of the external EGR gas introduced into the combustion chamber 6 is sufficiently lower than that of the internal EGR gas. By the above control of the internal and external EGR gas amounts, within the high load side of the second partial range B12, the amount of inert gas (gas not contributed to the combustion) introduced into the combustion chamber 6 can be secured while preventing the temperature inside the combustion chamber 6 from being excessively high.

Further in this embodiment, the intake open timing IVO and the exhaust close timing EVC within the partial ranges B11 to B23 are set so that they continuously change when the engine load changes across the first to fourth loads T11 to T22. Therefore, when the engine load changes across the first to fourth loads T11 to T22, the intake open timing IVO, the intake close timing IVC, the exhaust open timing EVO, and the exhaust close timing EVC are prevented from changing significantly, and the controllability of the intake and exhaust valves 11 and 12 is improved. This is advantageous in achieving SPCCI combustion even if the operating state and the environmental condition change.

Furthermore, in this embodiment, during the execution of SPCCI combustion (while operating within the first partially warmed-up range B1), the timing of the main ignition by the spark plug 16, etc. are adjusted so that the SI ratio being a target value of a ratio of a heat amount generated by SI combustion with respect to a total heat generation amount in one combustion cycle matches with the target SI ratio determined according to the operating condition of the engine. Therefore, for example, the ratio of CI combustion is increased (i.e., the SI ratio is reduced) as much as possible within the extent that the combustion noise does not become excessive. This results in improving thermal efficiency by SPCCI combustion as much as possible.

(8) Modifications

In this embodiment, the SI ratio which is the ratio of the heat amount generated by SI combustion with respect to the total heat amount generated by SPCCI combustion is defined as R1/(R1+R2) by using the areas R1 and R2 in the combustion waveform of FIG. 7, and the main ignition timing is adjusted to match the given target SI ratio; however, the SI ratio may be defined in other manners.

Figure 24:
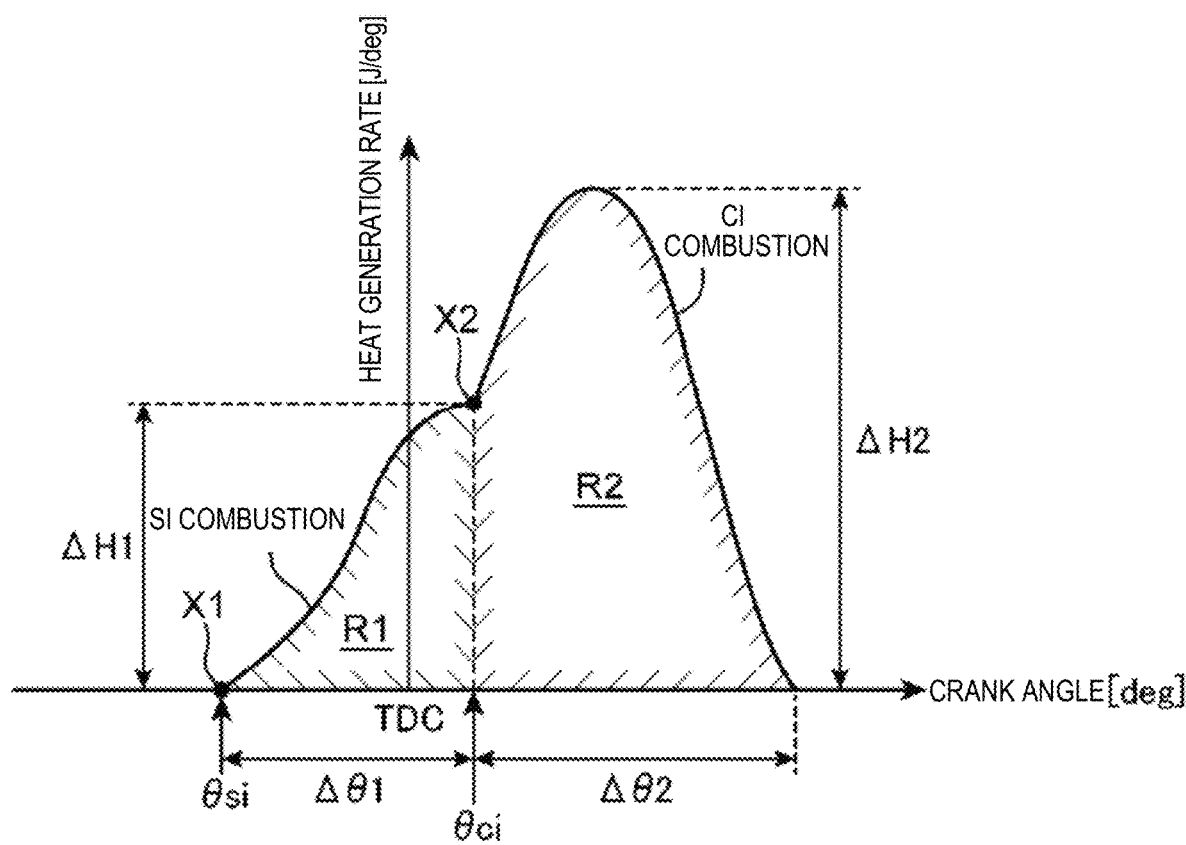
FIG. 24 is a chart corresponding to FIG. 7, illustrating various defining methods of an SI ratio.

For example, SI ratio=R1/R2 may be established. Further, the SI ratio may be defined using $\Delta\theta 1$ and $\Delta\theta 2$ illustrated in FIG. 24. That is, when the crank angle period of SI combustion (the combustion period on the advancing side of the flection point X2) is $\Delta\theta 1$ and the crank angle period of CI combustion (the combustion period on the retarding side of the flection point X2) is $\Delta\theta 2$, SI ratio=$\Delta\theta 1/(\Delta\theta 1+\Delta\theta 2)$ or SI ratio=$\Delta\theta 1/\Delta\theta 2$ may be established. Alternatively, when a peak of the heat generation rate of SI combustion is $\Delta H1$ and a peak of the heat generation rate of CI combustion is $\Delta H2$, SI ratio=$\Delta H1/(\Delta H1+\Delta H2)$ or SI ratio=$\Delta H1/\Delta H2$ may be established.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

2 Cylinder
11 Intake Valve
12 Exhaust Valve
13a Intake VVT (Intake Phase-Variable Mechanism)
14a Exhaust VVT (Exhaust Variable Mechanism)
15 Injector
16 Spark Plug
30 Intake Passage
40 Exhaust Passage
100 ECU (Controller)

What is claimed is:

1. A control system for a compression-ignition engine including a cylinder, an intake passage, an exhaust passage, an intake port communicating the intake passage to the cylinder, an intake valve configured to open and close the intake port, an exhaust port communicating the exhaust passage to the cylinder, an exhaust valve configured to open and close the exhaust port, an injector configured to inject fuel into the cylinder, and a spark plug configured to ignite a mixture gas containing the fuel injected by the injector and air, the engine executing partial compression-ignition combustion in which the mixture gas is spark-ignited with the spark plug to be partially combusted by SI (spark ignition) combustion and the remaining mixture gas self-ignites to be combusted by CI (compression ignition) combustion, comprising:

an intake phase-variable mechanism configured to simultaneously change an open timing and a close timing of the intake valve; and a controller including a processor configured to control parts of the engine, including the intake phase-variable mechanism and the spark plug, wherein while the engine is operating within a given first operating range and a second operating range that is on a higher engine load side of the first operating range, the controller is configured to control the intake phase-variable mechanism to form a gas-fuel ratio (G/F) lean environment in which an air-fuel ratio that is a ratio of air to fuel inside the cylinder is near a stoichiometric air-fuel ratio and burnt gas remains inside the cylinder, and control the spark plug to spark-ignite the mixture gas so as to combust by the partial compression-ignition combustion at a given timing, while the engine is operating within the first operating range, the controller is configured to control the intake phase-variable mechanism to continuously retard, as the engine load increases at a constant engine speed, the open timing of the intake valve on an advancing side of a top dead center of exhaust stroke, and while the engine is operating within the second operating range, the controller is configured to control the intake phase-variable mechanism to continuously advance, as the engine load increases at a constant engine speed, the close timing of the intake valve on a retarding side of a bottom dead center of intake stroke.

2. The control system of claim 1, wherein
the first and second operating ranges are adjacent to each other in an engine load direction bordering on a given first reference load, and
the open timing of the intake valve is set so as to continuously change within the first and second operating ranges when the engine load changes across the first reference load.

3. The control system of claim 1, further comprising an exhaust gas recirculation (EGR) device including an EGR passage communicating the intake passage to the exhaust passage, and an EGR valve configured to adjust an amount of exhaust gas recirculated into the cylinder from the exhaust passage through the EGR passage,
wherein, within at least a portion of an engine speed segment of the first operating range, the controller is configured to control the EGR device to increase an external EGR ratio as the engine load increases, the external EGR ratio being a ratio of the exhaust gas introduced into the cylinder by the EGR device.

4. The control system of claim 1, further comprising a booster configured to boost intake air to be introduced into the cylinder, and an exhaust variable mechanism configured to change a close timing of the exhaust valve, wherein
while the engine is operating within a third operating range set in a low load segment of an operating range where the partial compression-ignition combustion is performed in the G/F lean environment, the controller is configured to control the booster to not perform the boost, and control the exhaust variable mechanism to advance, as the engine load increases, the close timing of the exhaust valve on a retarding side of the top dead center of the exhaust stroke, and
while the engine is operating within a fourth operating range set in a high load segment of the operating range where the partial compression-ignition combustion is performed in the G/F lean environment, the controller is configured to control the booster to perform the boost, and control the exhaust variable mechanism to retard, as the engine load increases, the close timing of the exhaust valve on the retarding side of the top dead center of the exhaust stroke.

5. The control system of claim 4, wherein
the first and second operating ranges are adjacent to each other in the engine load direction bordering on a given first reference load,
the third and fourth operating ranges are adjacent to each other in the engine load direction bordering on a given second reference load, and
the first and second reference loads are set to a same value as each other at least in a portion of an engine speed segment.

6. The control system of claim 1, wherein,
during the partial compression-ignition combustion, the controller is configured to set a target SI ratio according to an operating condition of the engine and set an ignition timing of the spark plug based on the target SI ratio, the target SI ratio being a target value of a ratio of a heat amount generated by the SI combustion with respect to a total heat generation amount in one combustion cycle.

* * * * *